US011572938B2

(12) United States Patent
Van Druten

(10) Patent No.: US 11,572,938 B2
(45) Date of Patent: Feb. 7, 2023

(54) TRANSMISSION SYSTEM FOR A VEHICLE

(71) Applicant: Punch Powertrain N.V., Sint-Truiden (BE)

(72) Inventor: Roell Marie Van Druten, Sint-Truiden (BE)

(73) Assignee: Punch Powertrain PSA E-Transmissions N.V., Sint-Truiden (BE)

( * ) Notice: Subject to any disclaimer, the term of this patent is extended or adjusted under 35 U.S.C. 154(b) by 0 days.

(21) Appl. No.: 16/606,243

(22) PCT Filed: Apr. 18, 2018

(86) PCT No.: PCT/EP2018/059887
§ 371 (c)(1),
(2) Date: Oct. 18, 2019

(87) PCT Pub. No.: WO2018/192965
PCT Pub. Date: Oct. 25, 2018

(65) Prior Publication Data
US 2020/0124151 A1      Apr. 23, 2020

(30) Foreign Application Priority Data

Apr. 18, 2017 (NL) .................................. 2018735
Nov. 6, 2017 (NL) .................................... 2019856

(51) Int. Cl.
*F16H 37/06* (2006.01)
*F16H 3/46* (2006.01)
(Continued)

(52) U.S. Cl.
CPC ........... *F16H 37/065* (2013.01); *F16D 13/38* (2013.01); *F16H 1/22* (2013.01); *F16H 3/006* (2013.01);
(Continued)

(58) Field of Classification Search
CPC ................. F16H 2200/2035–2061; F16H 2200/2007–2017;
(Continued)

(56) References Cited

U.S. PATENT DOCUMENTS 5,569,108 A    10/1996   Cadee et al.
8,899,122 B2 * 12/2014   Van Druten ........... F16H 37/042
                                                74/331

(Continued)

FOREIGN PATENT DOCUMENTS

EP    0034412 A3    12/1981
EP    1625037 B1     1/2008
(Continued)

OTHER PUBLICATIONS

Aug. 13, 2018, International Search Report and Written Opinion, PCT/EP2018/059887.

*Primary Examiner* — Ernesto A Suarez
*Assistant Examiner* — Lillian T Nguyen
(74) *Attorney, Agent, or Firm* — Banner & Witcoff, Ltd.

(57) ABSTRACT

Transmission system for a vehicle having an input arranged for connection to a drive source, and an output arranged for connection to a load. The transmission includes a transmission. The transmission includes first input shaft, a first output shaft connected to the output, and a first speed transforming gear connecting the first input shaft and the first output shaft, and a second input shaft, a second output shaft connected to the output, and a second speed transforming gear connecting the second input shaft and the second output shaft. The transmission includes a first coupling member, arranged for coupling the input to the first input shaft at a first speed ratio and a second coupling member, arranged for coupling the input to the second input shaft at a second speed ratio. The first and second speed transforming gears together include a plurality of transmission gears, wherein the transmission (Continued)

gears are arranged such that successive shifting through respective first, second, third, fourth, fifth and sixth gears is effected by alternatingly engaging the first coupling member and the second coupling member.

10 Claims, 30 Drawing Sheets

(51) Int. Cl.
- *F16D 13/38* (2006.01)
- *F16H 1/22* (2006.01)
- *F16H 3/00* (2006.01)
- *F16H 37/04* (2006.01)

(52) U.S. Cl.
CPC ............ *F16H 3/46* (2013.01); *F16H 37/042* (2013.01); *F16H 2037/048* (2013.01); *F16H 2200/0034* (2013.01); *F16H 2200/0043* (2013.01); *F16H 2200/0047* (2013.01); *F16H 2200/0052* (2013.01); *F16H 2200/2005* (2013.01); *F16H 2200/2033* (2013.01); *F16H 2200/2035* (2013.01); *F16H 2702/02* (2013.01)

(58) Field of Classification Search
CPC . F16H 2200/0034–0082; F16H 37/065; F16H 2037/048
See application file for complete search history.

(56) References Cited

U.S. PATENT DOCUMENTS

| | | | |
|---|---|---|---|
| 2012/0053011 A1* | 3/2012 | Onomura | B60L 15/20 475/5 |
| 2013/0337972 A1* | 12/2013 | Lee | B60K 6/365 903/902 |
| 2015/0300470 A1* | 10/2015 | Markl | B60K 17/3467 475/207 |
| 2015/0321545 A1 | 11/2015 | Park et al. | |
| 2015/0321662 A1* | 11/2015 | Park | B60K 6/48 475/5 |
| 2016/0312857 A1 | 1/2016 | Leppanen et al. | |
| 2017/0057489 A1 | 3/2017 | Schaefer et al. | |
| 2018/0065467 A1* | 3/2018 | Lee | B60K 6/543 |

FOREIGN PATENT DOCUMENTS

| | | |
|---|---|---|
| JP | S62242165 A | 10/1987 |
| WO | 2005085674 A1 | 9/2005 |
| WO | 2006046868 A1 | 5/2006 |
| WO | 2011133033 A1 | 10/2011 |
| WO | 2012102613 A1 | 8/2012 |
| WO | 2012112028 A2 | 8/2012 |
| WO | 2014017905 A9 | 1/2014 |

* cited by examiner

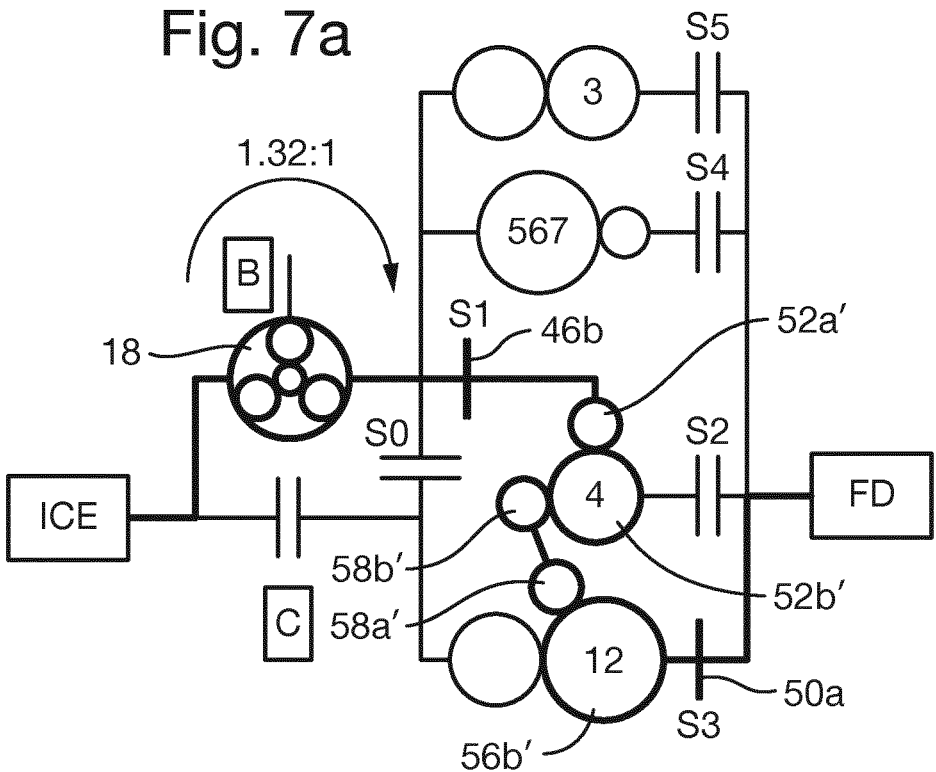
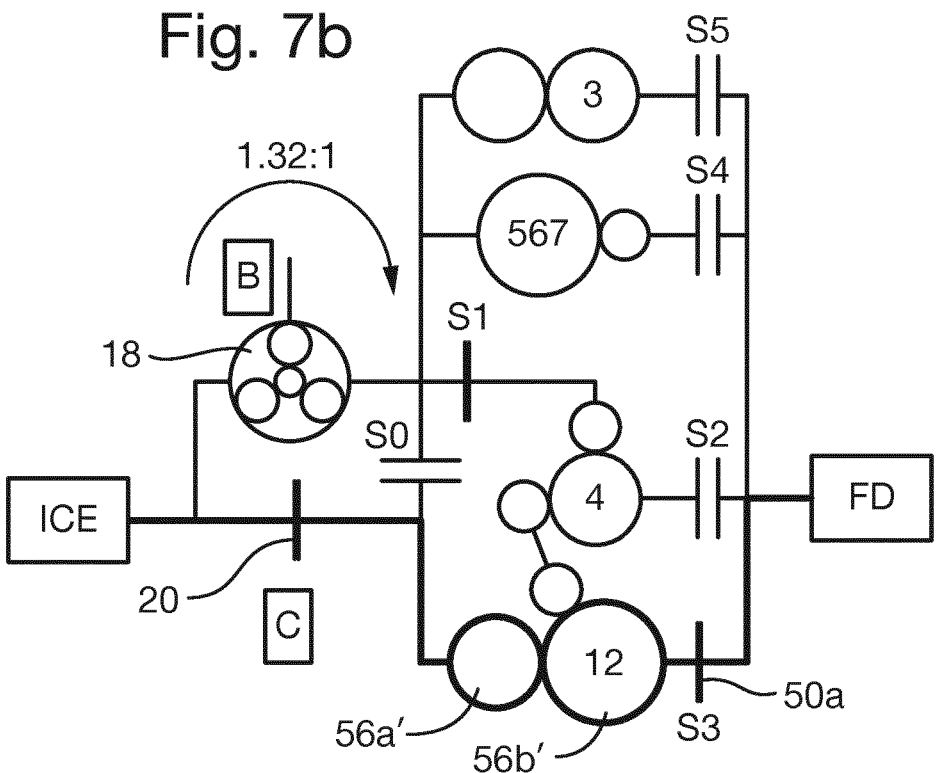

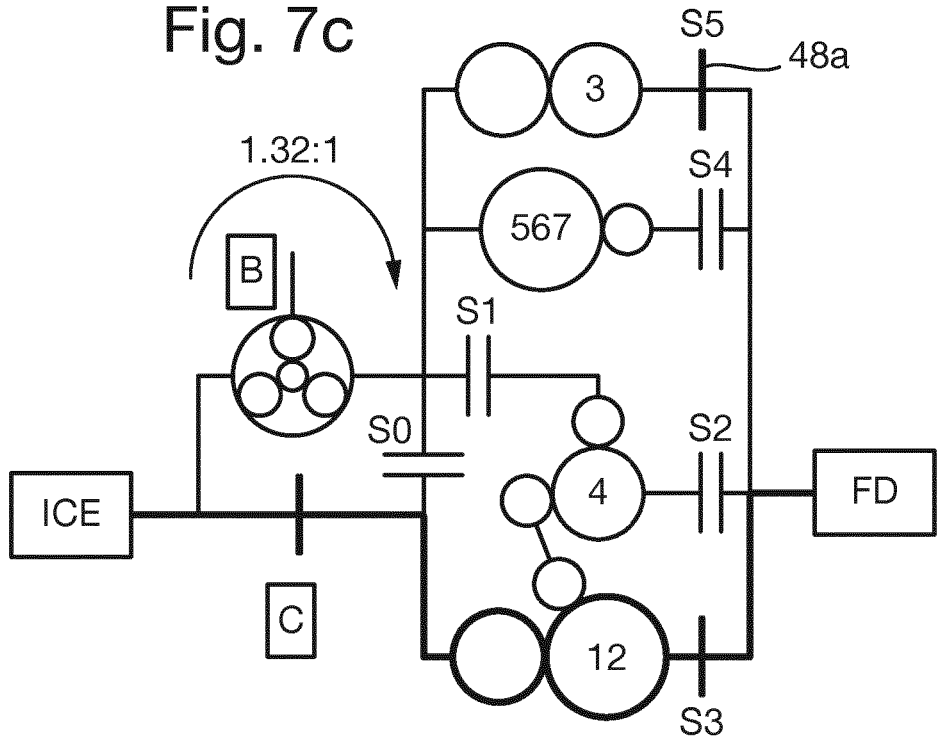
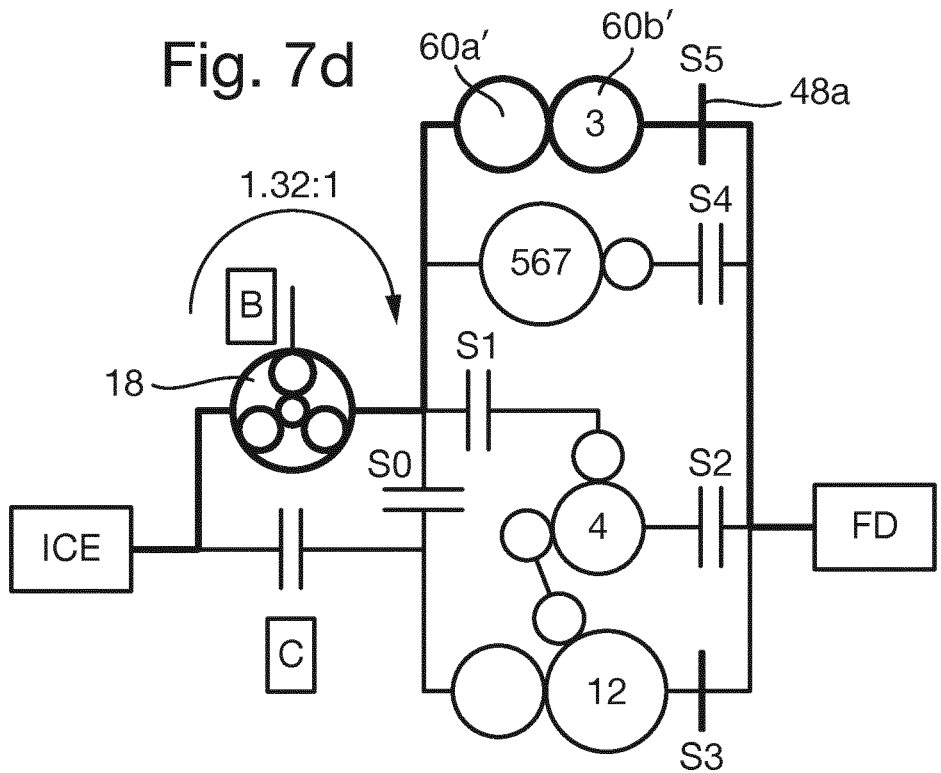

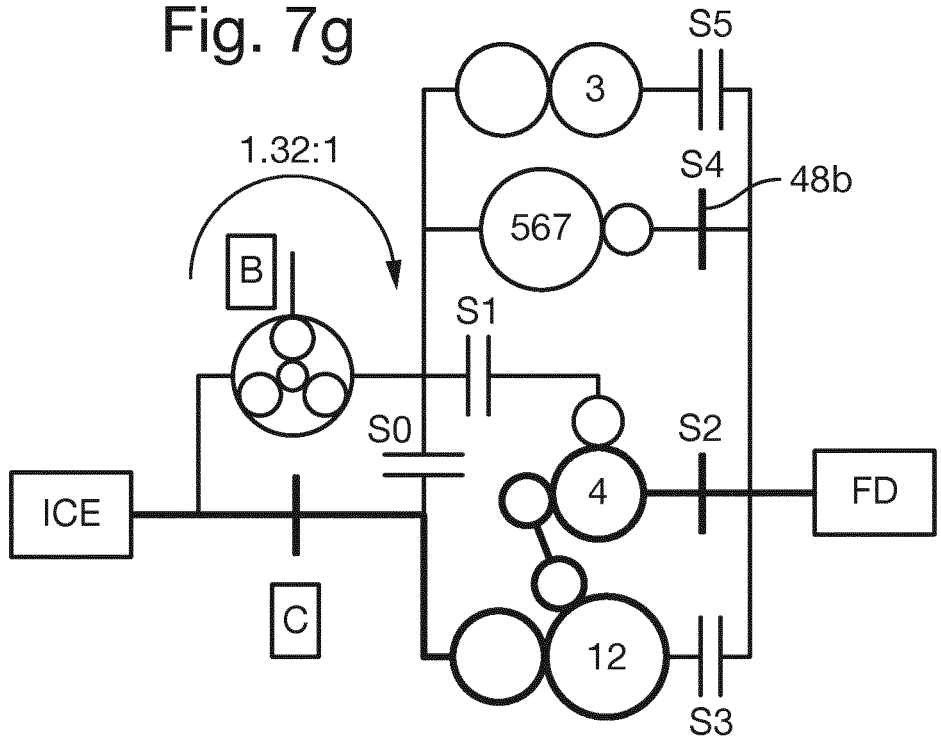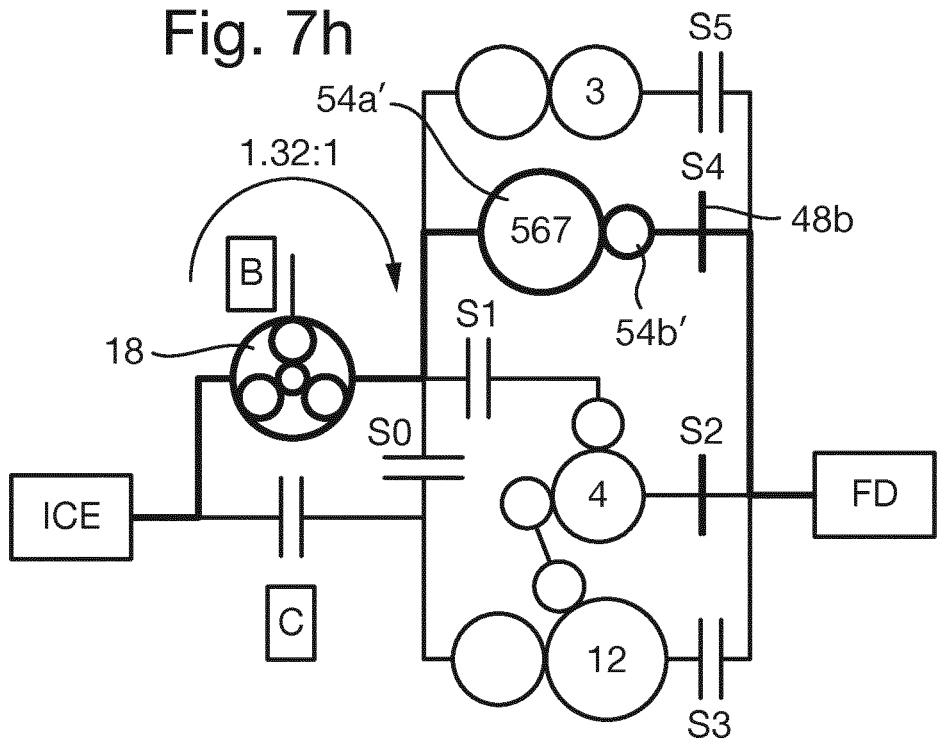

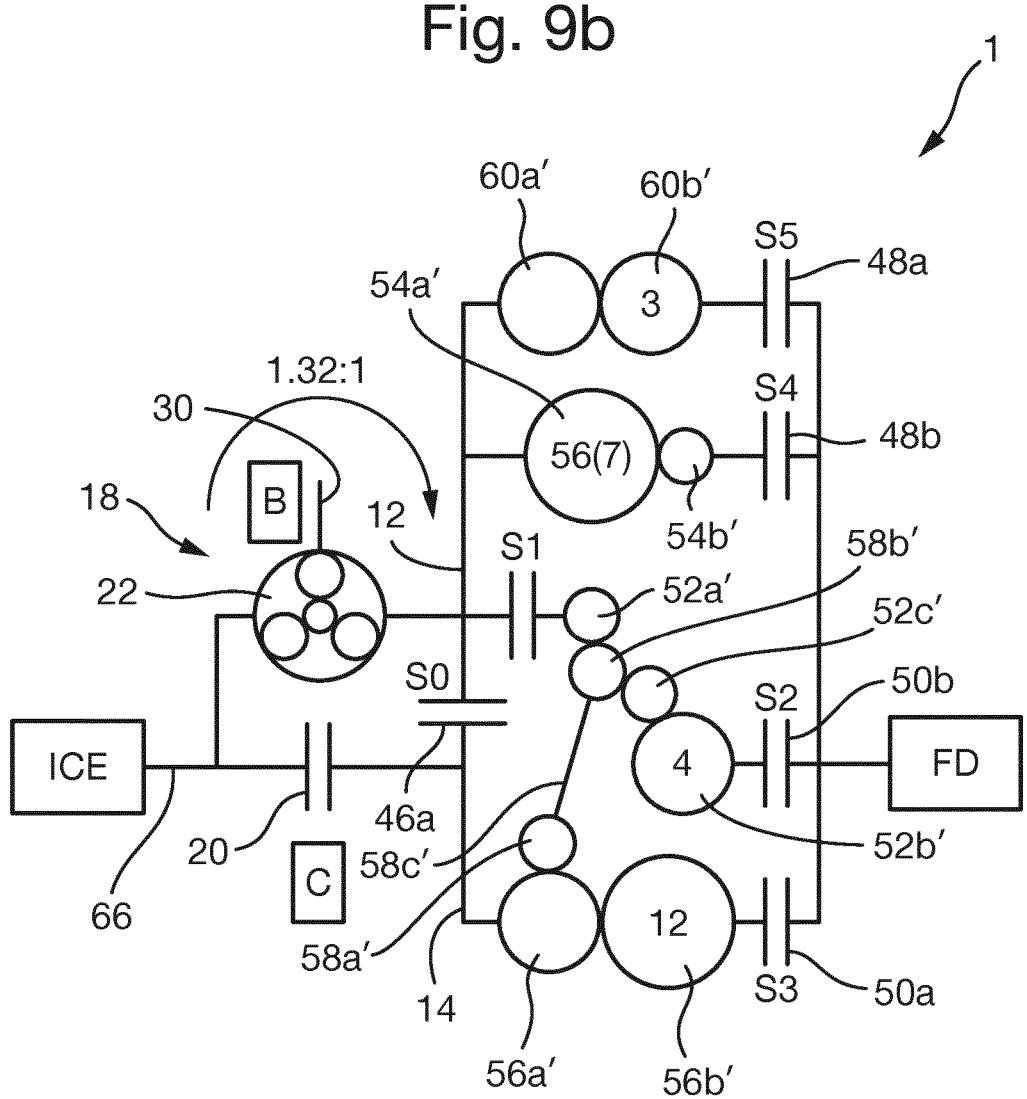

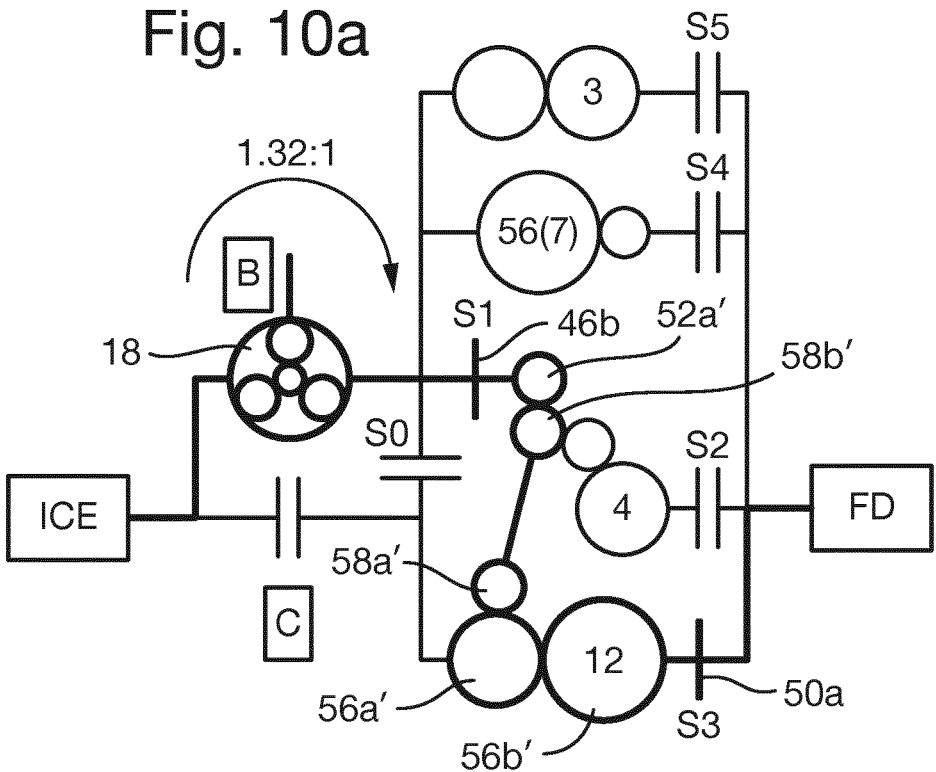
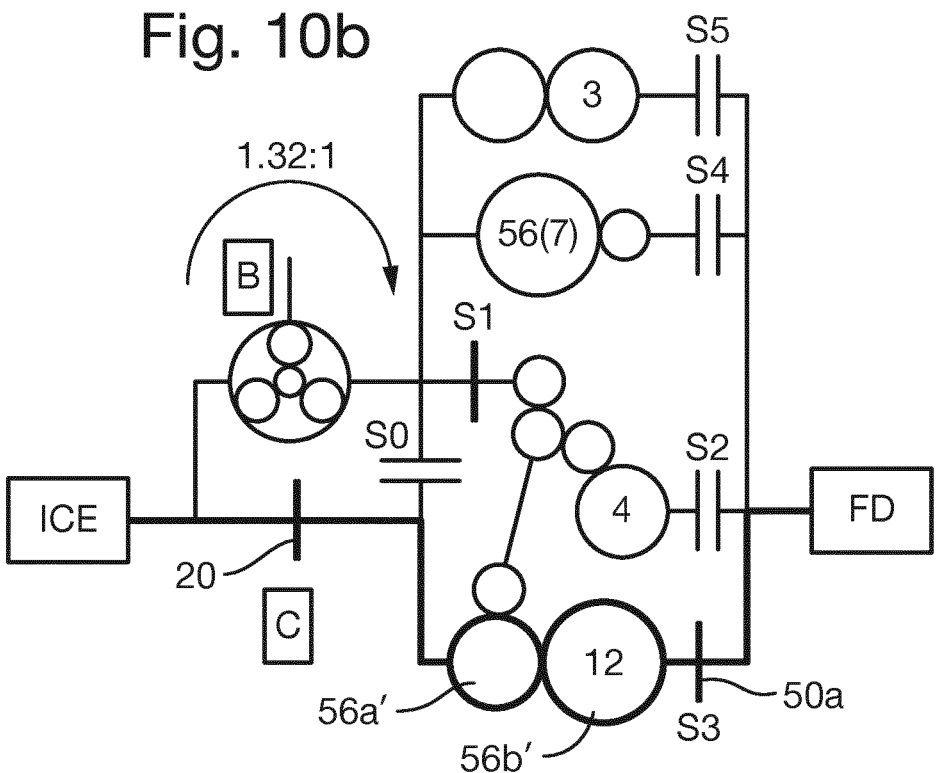

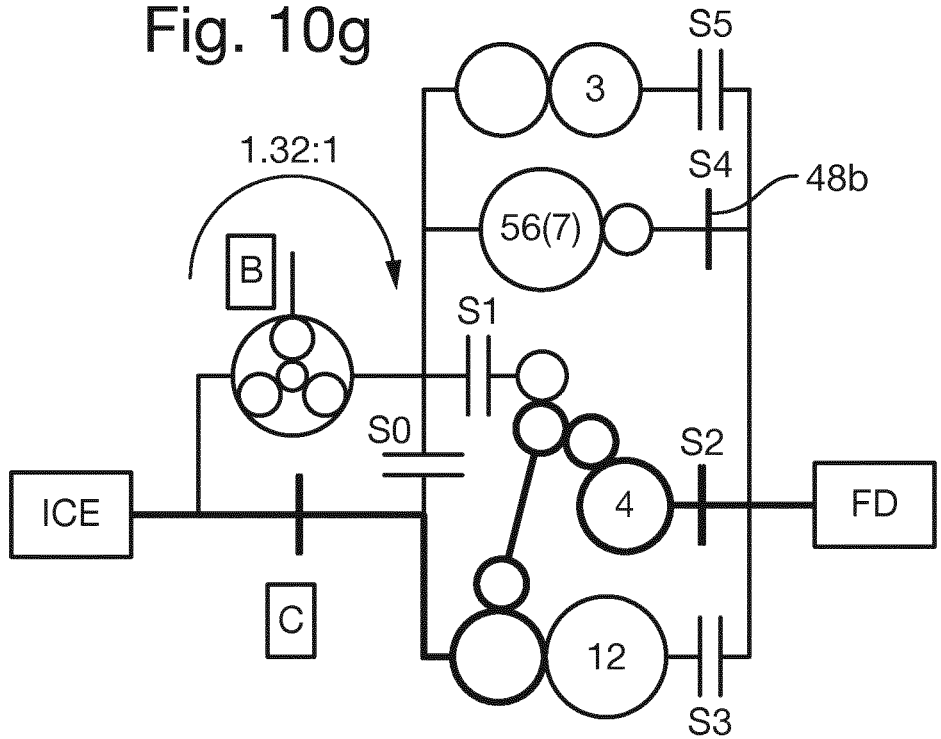
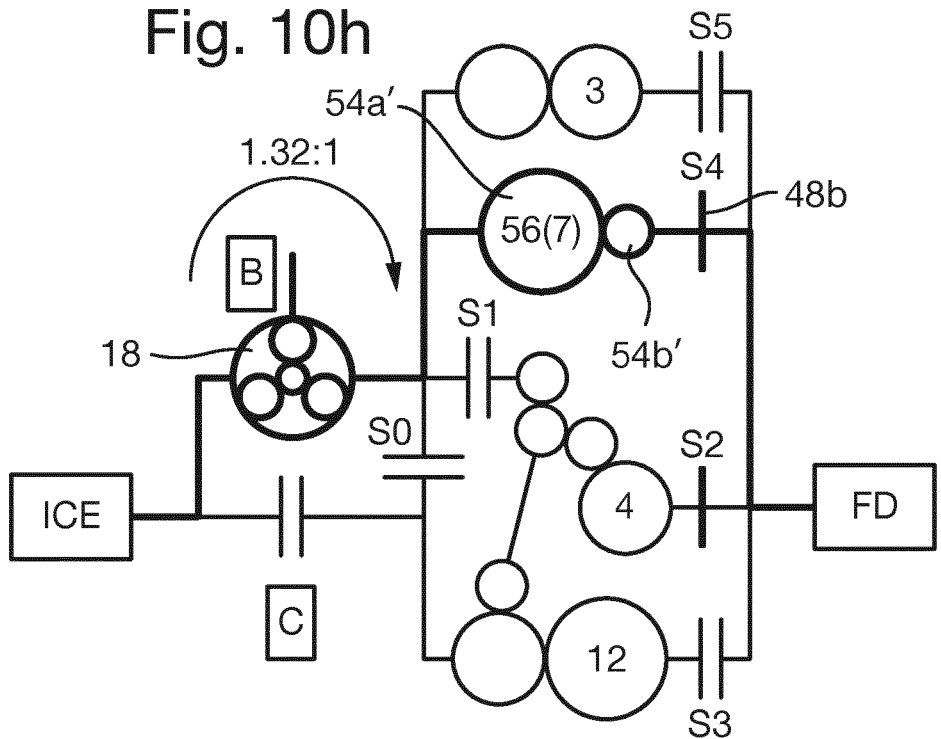

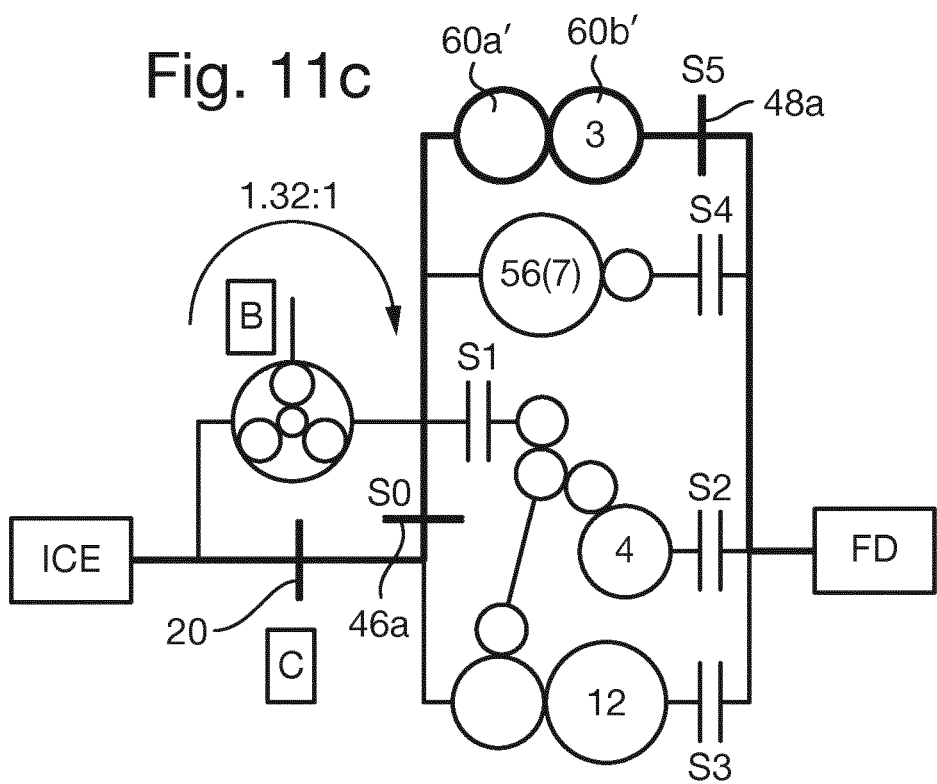
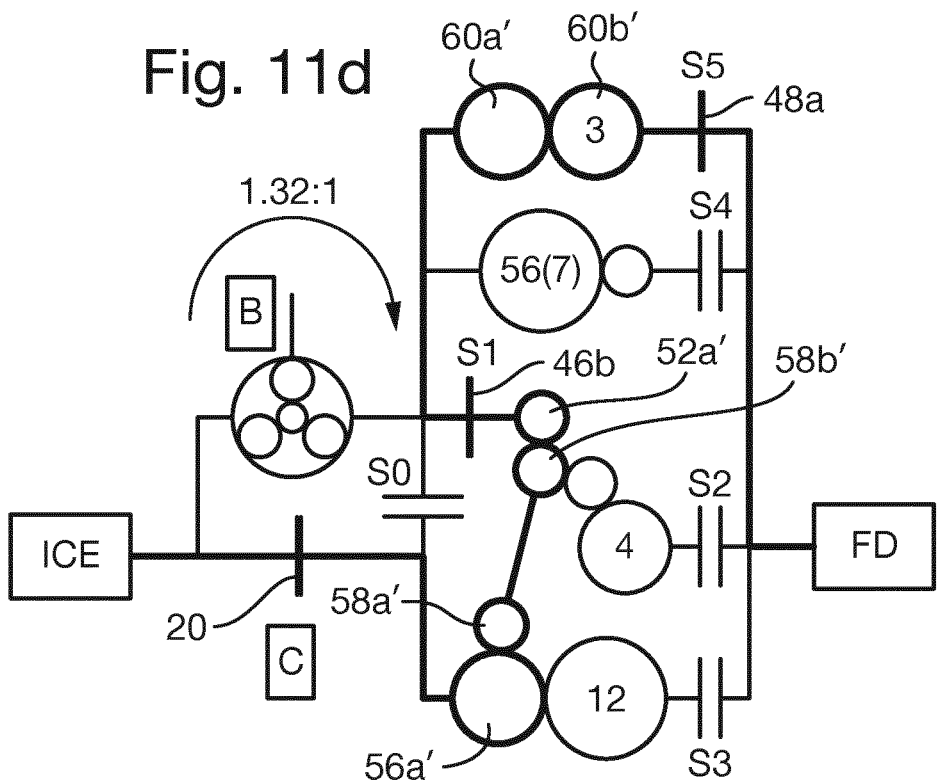

TRANSMISSION SYSTEM FOR A VEHICLE

CROSS-REFERENCE TO RELATED APPLICATIONS

This application is a U.S. National Stage application under 35 U.S.C. § 371 of International Application PCT/EP2018/059887 (published as WO 2018/192965 A1), filed Apr. 18, 2018, which claims the benefit of priority to Application NL 2018735, filed Apr. 18, 2017, and to Application NL 2019856, filed Nov. 6, 2017. Benefit of the filing date of these prior applications is hereby claimed. Each of these prior applications is hereby incorporated by reference in its entirety.

FIELD OF THE INVENTION

The invention relates to a transmission system for a vehicle having an input arranged for connection to a drive source, and an output arranged for connection to a load.

BACKGROUND TO THE INVENTION

Transmission systems, such as automatic transmission systems for vehicles are known. Such transmission systems generally have an input arranged for connection to a drive source, such an internal combustion engine, and an output arranged for connection to a load, such as a drive train of the vehicle. One type of transmission system includes a transmission comprising a first input shaft, a first output shaft connected to the output, and a first speed transforming gear between the first input shaft and the first output shaft, and a second input shaft, a second output shaft connected to the output, and a second speed transforming gear between the second input shaft and the second output shaft. Hence, different gears, such as first gear, second gear, third gear, etc. can be associated with the first input shaft or the second input shaft, and can be individually selected.

WO2011/133033A1 describes a transmission system including a first coupling member having a first section which is connected to the input, and a second section which is connected to the first input shaft of the transmission, and a second coupling member having a third section which is connected to the input, and a fourth section which is connected to the second input shaft of the transmission.

SUMMARY OF THE INVENTION

It is an object to provide a transmission system which is more cost-effective than the known transmission system. Alternatively, or additionally, it is an object to provide a transmission system allowing smooth shifting through successive gears. Alternatively, or additionally, it is an object to provide a transmission system that is flexible in the selection of transmission gears.

More in general it is an object to provide an improved, or at least alternative, transmission system.

According to an aspect is provided a transmission system, such as an automatic transmission system, for a vehicle. The transmission system has an input arranged for connection to a drive source, such as an internal combustion engine and/or electric motor. The transmission system has an output arranged for connection to a load, such as wheels of the vehicle. The transmission system includes a transmission. The transmission includes a first input shaft, a first output shaft connected to the output, and a first speed transforming gear connecting the first input shaft and the first output shaft. The transmission includes a second input shaft, a second output shaft connected to the output, and a second speed transforming gear connecting the second input shaft and the second output shaft.

Herein the term speed transforming gear is used to denote a combination, e.g. a pair, of gear wheels transforming a rotational speed at a respective input shaft into a (lower, equal or higher) rotational speed at a respective output shaft. The transmission system allows the vehicle to be operated in different gears, such as reverse gear, first gear, second gear, third gear, fourth gear, fifth gear, etc. Each speed transforming gear is associated with one or more transmission gears. Herein a transmission gear denotes a combination, e.g. pair, or gear wheels causing the transmission to operate in a predetermined gear. E.g. a first transmission gear causes the transmission to operate in first gear, a second transmission gear causes the transmission to operate in a second gear, etc. It will be appreciated that it is possible that different transmission gears share one or more gear wheels. For example a first/second transmission gear denotes a combination, e.g. pair, or gear wheels causing the transmission to operate in first or second gear, e.g. depending on settings of coupling members of the transmission system.

According to this aspect the transmission system includes a first coupling member including a first friction element, the first coupling member having a first section which is connected to the input, and a second section which is connected to the first input shaft of the transmission. The transmission system includes a second coupling member including a second friction element, the second coupling member having a third section which is connected to the input, and a fourth section which is connected to the second input shaft of the transmission. The first and/or second speed transforming gears are positioned between the first friction element and the second friction element. The first and/or second speed transforming gears can be positioned between the first friction element and the second friction element in an axial direction of the transmission system. The axial direction of the transmission system can be defined as an axial direction of a rotational axis of the first and/or second friction element. The first and/or second speed transforming gears are preferably physically positioned between the first friction element and the second friction element. The first and/or second speed transforming gears can be positioned at a plane/planes between a plane in which the first friction element extends, and a plane in which the second friction element extends. This provides the advantage that the mechanical layout of components of the transmission system can be simplified and/or made more compact.

Optionally, the first friction element is arranged at a first end of the transmission and/or the second friction element is arranged at a second, opposite, end of the transmission, e.g. at a the side of the drive source.

Optionally, the first and/or second coupling member includes, e.g. is, a friction clutch, such as a wet or dry plate friction clutch.

Optionally, the first and/or second coupling member includes, e.g. is, a planetary gear set comprising at least three rotational members and a friction element, such as a brake. The at least three rotational members can include a sun gear, a planet carrier and a ring gear.

Optionally, the first coupling member includes a planetary gear set. The first section of the first coupling member can be associated with a first rotational member of the planetary gear set. The second section of the first coupling member can be associated with a second rotational member of the planetary gear set. A third rotational member of the planetary gear set can be associated with the first friction element, such as a friction brake.

Optionally, the first and/or second coupling member includes, e.g. is a planetary gear set comprising at least four rotational members and two brakes. The first section of the first coupling member can be associated with a first rotational member of the planetary gear set. The second section of the first coupling member can be associated with a second rotational member of the planetary gear set. A third rotational member of the planetary gear set can be associated with the first friction element, such as a first friction brake. A fourth rotational member of the planetary gear set can be associated with the further friction element, such as a second friction brake.

Optionally, the first coupling member includes the planetary gear set and the second coupling member includes the friction clutch. The friction clutch can be positioned at the drive source side of the transmission system, e.g. at a front end of the transmission system, e.g. close to an engine flywheel and/or input shaft of the transmission, and the friction element of the planetary gear set can be positioned at the opposite side of the transmission system, e.g. at a back end of the transmission system. Herein the rotational members of the planetary gear set can be axially positioned between the friction clutch and the friction brake of the planetary gear set. The first and/or second speed transforming gears can be positioned between the rotational members and the friction brake of the planetary gear set in an axial direction of the transmission system A first rotational member of the planetary gear set can be connected to the input. A second rotational member of the planetary gear set can be connected to the first input shaft. A third rotational member of the planetary gear set can be connected to the first friction element.

At least one of the rotational members of the planetary gear set, e.g. the sun gear, planet carrier and ring gear of the planetary gear set, can be positioned at one side, e.g. the drive source side, of the transmission system and the friction element of the planetary gear set can be positioned at the opposite side of the transmission system.

Optionally, a rotational member of the planetary gear set, such as the planet carrier, is directly connected to a gear of the first or second speed transforming gears. Thus the number of parts can be reduced. Optionally, that rotational member is directly connected to a gear wheel of a high transmission gear, e.g. sixth or seventh gear, or the highest gear. Such gear wheel of the high gear can have a large radius compared to gear wheels of other transmission gears.

Optionally, at least one rotational member of the planetary gear set is at least partially positioned inside a gear wheel of the first or second speed transforming gears. Thus a compact build can be realized.

Optionally, the first and second speed transforming gears each include an input gear wheel and an output gear wheel which are radially offset, i.e. have non-coinciding shafts. Optionally, the first and second speed transforming gears each includes one or more transmission gears. Optionally, each transmission gear, except a reverse gear, consists of an input gear wheel and an output gear wheel which are radially offset. The reverse gear can consist of an input gear wheel, an output gear wheel and an intermediate gear wheel, which are all radially offset.

Optionally, the first and second speed transforming gears are free from planetary gear sets. Optionally the first and second speed transforming gear consist of gear wheels mounted on shafts that are stationary relative to each other.

Optionally, a further coupling member, such as a further clutch, is located between the first and second input shaft. The further coupling member can then e.g. directly couple the first and the second input shaft to each other without the use of a further speed transforming gear.

Optionally, the first and/or second speed transforming gear includes a reverse gear. Optionally, the reverse gear does not reverse the direction of rotation between the first input shaft and the first output shaft of the transmission. The second speed transforming gear can include a transmission gear, e.g. the second gear, directly coupled to the reverse gear. Thereto, a gear wheel of the reverse gear can mesh with a gear wheel of the directly coupled transmission gear. This allows for reducing the number of parts and/or reducing the number of larger gear wheels and/or compacter build.

According to an aspect is provided a transmission system, such as an automatic transmission system, for a vehicle. The transmission system has an input arranged for connection to a drive source, such as an internal combustion engine and/or electric motor. The transmission system has an output arranged for connection to a load, such as wheels of the vehicle. The transmission system includes a transmission. The transmission includes a first input shaft, a first output shaft connected to the output, and a first speed transforming gear connecting the first input shaft and the first output shaft. The transmission includes a second input shaft, a second output shaft connected to the output, and a second speed transforming gear connecting the second input shaft and the second output shaft.

According to this aspect the transmission system includes a first coupling member, arranged for selectively coupling the input to the first input shaft at a first speed ratio. Hence, optionally, the first coupling member can, in addition to coupling the input to the first input shaft, also transform a rotational speed at the input into a (lower, equal or higher) rotational speed at the first input shaft. The transmission system includes a second coupling member, arranged for selectively coupling the input to the second input shaft at a second speed ratio. Hence, optionally, the second coupling member can, in addition to coupling the input to the second input shaft, also transform a rotational speed at the input into a (lower, equal or higher) rotational speed at the second input shaft. The first speed ratio differs from the second speed ratio. Hence, at least one of the first or second coupling member is arranged for transforming a rotational speed at the input into a (lower, equal or higher) rotational speed at the respective first or second input shaft.

The first and second speed transforming gears together include a plurality of transmission gears. The transmission gears are arranged such that successive shifting through respective first, second, third, fourth, fifth and sixth gears is effected by alternatingly engaging the first coupling member and the second coupling member. This allows for smooth shifting without necessitating intermediate shifts to shift to a next gear while maintaining torque.

Optionally, the first and second speed transforming gears together include a set of transmission gears. Each transmission gear of the set of transmission gears includes an input gear wheel and an output gear wheel. The input gear wheel is connected or connectable to the first or second input shaft. The output gear wheel is connected or connectable to the first or second output shaft. The first and second speed transforming gears together include a linking gear including a first linking gear wheel rotationally coupled to a second linking gear wheel. It will be appreciated that the linking gear can be included by the first speed transforming gear, by the second speed transforming gear, or jointly by the first and second speed transforming gears. The first linking gear wheel meshes with a gear wheel of a first of the transmission gears of the set of the transmission gears, and the second linking gear wheel meshes with a gear wheel of a second of the transmission gears of the set of transmission gears.

According to an aspect is provided a transmission system for a vehicle having an input arranged for connection to a drive source, and an output arranged for connection to a load. The transmission system includes a transmission. The transmission comprises a first input shaft, a first output shaft connected to the output, and a first speed transforming gear connecting the first input shaft and the first output shaft. The transmission comprises a second input shaft, a second output shaft connected to the output, and a second speed transforming gear connecting the second input shaft and the second output shaft. The transmission system includes a first coupling member, arranged for selectively coupling the input to the first input shaft at a first speed ratio. The transmission system includes a second coupling member, arranged for selectively coupling the input to the second input shaft at a second speed ratio, wherein the first and second speed ratios differ. The first and second speed transforming gears together include a set of transmission gears, each including an input gear wheel and an output gear wheel, wherein the input gear wheel is connected or connectable to the first or second input shaft, and the output gear wheel is connected or connectable to the first or second output shaft. The first and second speed transforming gears together include a linking gear including a first linking gear wheel rotationally coupled to a second linking gear wheel. The first linking gear wheel meshes with a gear wheel of a first of the transmission gears of the set of the transmission gears, and the second linking gear wheel meshes with a gear wheel of a second of the transmission gears of the set of transmission gears.

Optionally, the first linking gear meshes with an output gear wheel of the first of the transmission gears of the set of the transmission gears, and the second linking gear wheel meshes with an output gear wheel of the second of the transmission gears of the set of transmission gears. Optionally, the first linking gear meshes with an input gear wheel of the first of the transmission gears of the set of the transmission gears, and the second linking gear wheel meshes with an input gear wheel of the second of the transmission gears of the set of transmission gears.

Optionally, the first of the transmission gears of the set of the transmission gears is a forward gear, and the second of the transmission gears of the set of transmission gears is a forward gear. Alternatively, the first of the transmission gears of the set of the transmission gears is a forward gear, and the second of the transmission gears of the set of transmission gears is a reverse gear.

Optionally, the first linking gear wheel and the second linking gear wheel are both mounted to a common linking shaft.

Optionally, the first linking gear wheel meshes with a gear wheel of the first/second transmission gear, and the second linking gear wheel meshes with a gear wheel of the fourth transmission gear.

Optionally, the input gear wheel and the output gear wheel of a transmission gear of the set of transmission gears are radially offset.

Optionally, each transmission gear of the set of transmission gears consists of an input gear wheel and an output gear wheel which are radially offset.

Optionally, the first coupling member is arranged for coupling the input to the first input shaft while reducing rotational speed if coupled. Optionally, the second coupling member is arranged for coupling the input to the second input shaft while maintaining rotational speed if coupled. The first coupling member can be arranged for reducing the rotational speed of the first input shaft by a factor of between more than one and two relative to a rotational speed of the input. Optionally, the factor is between 1.2 and 1.7. Optionally, the factor is between 1.3 and 1.5.

According to an aspect is provided a transmission system, such as an automatic transmission system, for a vehicle. The transmission system has an input arranged for connection to a drive source, such as an internal combustion engine and/or electric motor. The transmission system has an output arranged for connection to a load, such as wheels of the vehicle. The transmission system includes a transmission. The transmission includes a first input shaft, a first output shaft connected to the output, and a first speed transforming gear connecting the first input shaft and the first output shaft. The transmission includes a second input shaft, a second output shaft connected to the output, and a second speed transforming gear connecting the second input shaft and the second output shaft. The first speed transforming gear includes a reverse gear. The second speed transforming gear includes a gear, e.g. the second gear, coupled, e.g. directly coupled, to the reverse gear. Thereto, a gear wheel of the reverse gear can mesh with a gear wheel of the directly coupled transmission gear.

Optionally, the second speed transforming gear includes a gear wheel, e.g. of the fifth gear, directly coupled to the reverse gear for forming an additional gear, e.g. the second gear.

Optionally, the first and/or second speed transforming gear includes a, e.g. forward, transmission gear, e.g. the fourth and/or fifth transmission gear, coupled to the reverse transmission gear so as to form an additional, e.g. forward, transmission gear, such the first and/or second transmission gear.

According to an aspect is provided a transmission system for a vehicle having an input arranged for connection to a drive source, and an output arranged for connection to a load. The transmission system includes a transmission. The transmission includes a first input shaft, a first output shaft connected to the output, and a first speed transforming gear connecting the first input shaft and the first output shaft. The transmission includes a second input shaft, a second output shaft connected to the output, and a second speed transforming gear connecting the second input shaft and the second output shaft. The first speed transforming gear includes a reverse transmission gear. A forward gear is formed using at least one gear wheel of the reverse transmission gear.

Optionally, an additional, e.g. forward, gear is formed using at least one gear wheel of a forward transmission gear and at least one gear wheel the reverse transmission gear. Optionally, the additional gear is formed using one or more additional gear wheels mounted on an additional shaft mounted radially offset from the first and second input shafts and/or the first and second output shafts.

Optionally, the reverse gear is connected to the first input shaft and/or the first output shaft via a coupling member.

Optionally, the transmission system includes a first gear, a second gear, a fourth gear and a fifth gear, wherein gear wheels of the first and second gear are mounted on a common shaft.

Optionally, the transmission system including an initial coupling member, such as a friction element, connected between the input of the transmission system and the second coupling member. The additional machine can be connected to an output of the initial coupling member and an input of the second coupling member. The initial coupling member enables coupling of the transmission to the drive source and/or to an additional machine. The drive source can e.g. be an internal combustion engine. The additional machine can be an electric machine, such as an electric motor or an electric generator. Hence, the initial coupling member can for example enable selection of either the internal combustion engine, either the electric machine (e.g. the electric motor) or both the internal combustion engine and the electric machine.

Optionally, the initial coupling member and/or the second coupling member is located axially within the additional machine. For example the electric motor can be arranged concentric with the initial coupling member.

Optionally, the additional machine is positioned radially offset relative to the initial coupling member. The additional machine can e.g. be coupled to the initial coupling member via one or more gears.

Optionally, the initial coupling member is normally open Hence the drive source is not engaged with the initial coupling not actuated.

Optionally, the second coupling member is arranged for actuation via an axial thrust bearing.

The planetary gear set may be present in a space that is located between a transmission housing of the transmission and a partition affixed to the outside of the transmission housing. Preferably, however, the planetary gear set is not present in a space that is located between the transmission housing and a partition affixed to the outside of the transmission housing. The planetary gear set can be located inside the transmission housing where the planetary gear set may be located in a sub-space separated from the transmission by a partition if any. The planetary gear set may also be located outside the transmission housing in a separate wet or dry space.

The transmission ratios of the planetary gear set and the transmission can be selected such that the lowest forward gear of the transmission system can be attained by closing the friction element of the planetary gear set.

Optionally, the first and the second rotational member of the planetary gear set are coupled directly to each other by means of the second coupling member, and a further coupling member, such as a further friction clutch, connected in series thereto, without the use of a further speed transforming gear. The further coupling member can then be located in the transmission between the first and the second input shaft. The further coupling member can then directly couple the first and the second input shaft to each other without the use of a further speed transforming gear.

According to an aspect is provided a vehicle including a transmission system as described hereinabove.

According to an aspect is provided a method for operating a transmission system for a vehicle. The transmission system has an input arranged for connection to a drive source, and an output arranged for connection to a load. The transmission system comprises a transmission. The transmission comprises a first input shaft, a first output shaft connected to the output, and a first speed transforming gear connecting the first input shaft and the first output shaft. The transmission comprises s second input shaft, a second output shaft connected to the output, and a second speed transforming gear connecting the second input shaft and the second output shaft. The transmission system includes a first coupling member arranged for coupling the input to the first input shaft at a first speed ratio. The transmission system incudes a second coupling member arranged for coupling the input to the second input shaft at a second speed ratio. The first and second speed ratios differ. The first and second speed transforming gears include a plurality of transmission gears. The transmission gears are arranged such that successive shifting through respective first, second, third, fourth, fifth and sixth gears is effected by alternatingly engaging the first coupling member and the second coupling member. The method includes that successive shifting through respective first, second, third, fourth, fifth and sixth gears is effected by alternatingly engaging the first coupling member and the second coupling member.

According to an aspect is provided a method for operating a transmission system for a vehicle. The transmission system has an input arranged for connection to a drive source, and an output arranged for connection to a load. The transmission system comprises a transmission. The transmission comprises a first input shaft, a first output shaft connected to the output, and a first speed transforming gear connecting the first input shaft and the first output shaft. The transmission comprises a second input shaft, a second output shaft connected to the output, and a second speed transforming gear connecting the second input shaft and the second output shaft. The transmission system includes a first coupling member arranged for coupling the input to the first input shaft at a first speed ratio. The transmission system includes a second coupling member arranged for coupling the input to the second input shaft at a second speed ratio. The first and second speed ratios differ. The first and second speed transforming gears together include a set of transmission gears, each including an input gear wheel and an output gear wheel, wherein the input gear wheel is connected or connectable to the first or second input shaft, and the output gear wheel is connected or connectable to the first or second output shaft. The first and second speed transforming gears together include a linking gear including a first linking gear wheel rotationally coupled to a second linking gear wheel, wherein the first linking gear wheel meshes with a gear wheel of a first of the transmission gears of the set of the transmission gears, and the second linking gear wheel meshes with a gear wheel of a second of the transmission gears of the set of transmission gears.

According to an aspect is provided a method for operating a transmission system for a vehicle. The transmission system includes an input arranged for connection to a drive source, and an output arranged for connection to a load. The transmission system includes a transmission. The transmission includes a first input shaft, a first output shaft connected to the output, and a first speed transforming gear connecting the first input shaft and the first output shaft. The transmission includes a second input shaft, a second output shaft connected to the output, and a second speed transforming gear connecting the second input shaft and the second output shaft. The transmission system includes a first coupling member including a first friction element, the first coupling member having a first section which is connected to the input, and a second section which is connected to the first input shaft of the transmission. The transmission system includes a second coupling member including a second friction element, the second coupling member having a third section which is connected to the input, and a fourth section which is connected to the second input shaft of the transmission. The first and/or second speed transforming gears are axially positioned between the first friction element, and the second friction element.

According to an aspect is provided a method for operating a transmission system for a vehicle. The transmission system includes an input arranged for connection to a drive source, and an output arranged for connection to a load. The transmission system includes a transmission. The transmission includes a first input shaft, a first output shaft connected to the output, and a first speed transforming gear connecting the first input shaft and the first output shaft. The transmission includes a second input shaft, a second output shaft connected to the output, and a second speed transforming gear connecting the second input shaft and the second output shaft. The first speed transforming gear includes a reverse gear. The method includes forming a forward gear by driving a gear wheel coupled to a gear wheel of the reverse gear and connected to the first or second output shaft.

According to an aspect is provided a method for operating a transmission system for a vehicle. The transmission system includes an input arranged for connection to a drive source, and an output arranged for connection to a load. The transmission system includes a transmission. The transmission includes a first input shaft, a first output shaft connected to the output, and a first speed transforming gear connecting the first input shaft and the first output shaft. The transmission includes a second input shaft, a second output shaft connected to the output, and a second speed transforming gear connecting the second input shaft and the second output shaft. The first speed transforming gear includes a reverse transmission gear. The method includes forming a forward gear is using at least one gear wheel of the reverse transmission gear.

It will be appreciated that any one or more of the above aspects, features and options can be combined. It will be appreciated that any one of the options described in view of one of the aspects can be applied equally to any of the other aspects. It will also be clear that all aspects, features and options described in view of the transmission system apply equally to the vehicle and the method.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIGS. 7a-7k show a schematic representation of a shifting sequence;

FIGS. 9a and 9b show a schematic diagram of a transmission system;

FIGS. 10a-10k show a schematic representation of a shifting sequence;

FIGS. 11a-11d show schematic diagrams of transmission systems;

DETAILED DESCRIPTION

Figure 1:
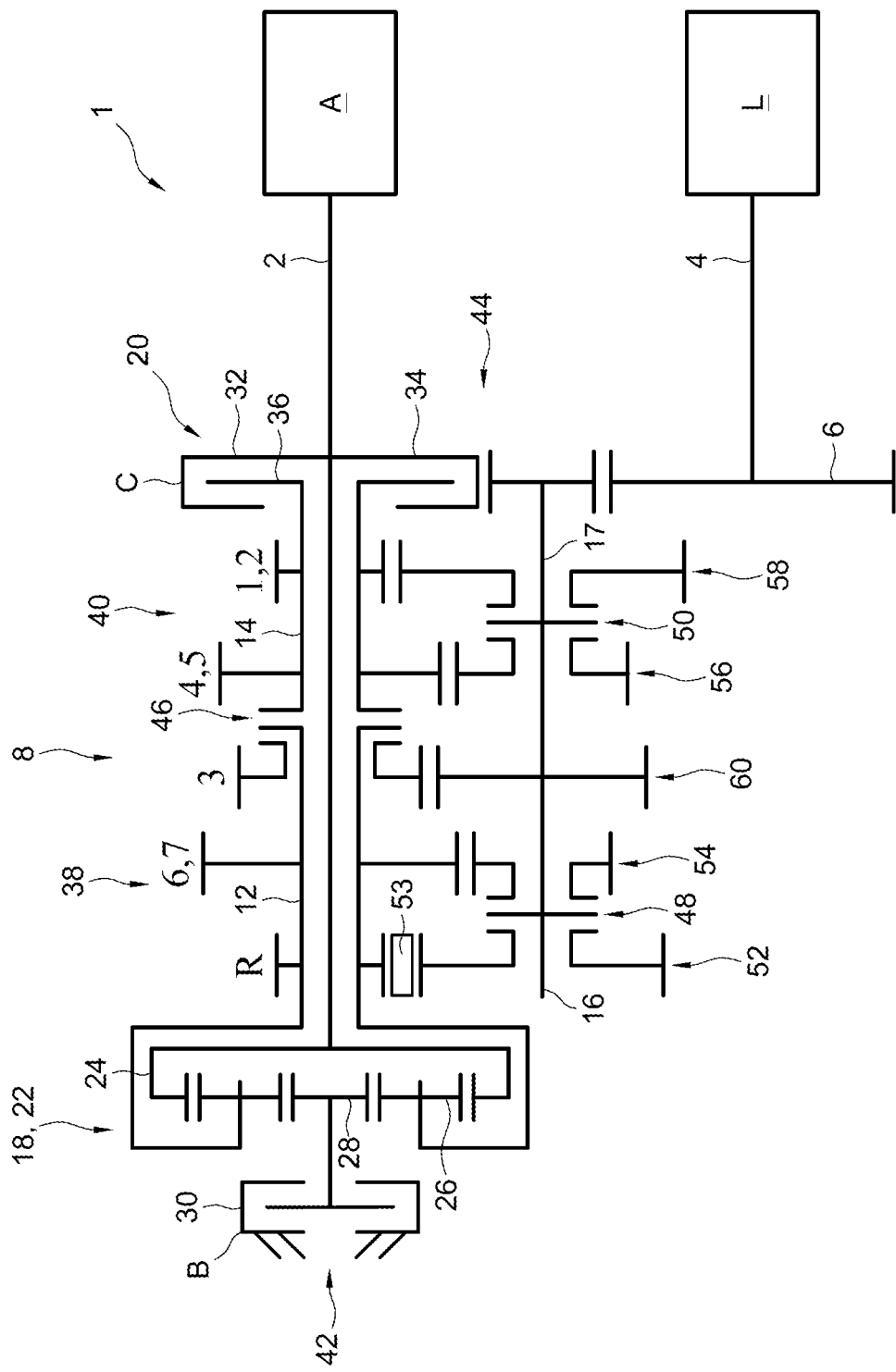
FIG. 1 shows a schematic diagram of a transmission system.

FIG. 1 shows a schematic representation of a transmission system 1 for a vehicle. The transmission system 1 comprises an input 2. Here the input 2 is connected to a drive source A. The transmission system 1 comprises an output 4. Here the output 4 is connected to a load L. In this example, the drive source A is an internal combustion engine. In this example the load L is formed by the wheels of the vehicle. The load L can e.g. be connected to the output 4 by means of a differential gear 6.

The transmission system 1 includes a transmission 8. The transmission 8 has a transmission housing 10. The transmission 8 has first input shaft 12 and a second input shaft 14. The transmission has a first output shaft 16 and a second output shaft 17 which are connected to the output 4. In this example the first output shaft 16 is rigidly connected to the second output shaft 17. Here the first output shaft 16 is unitary with the second output shaft 17.

The transmission system 1 further includes a first coupling member 18 and a second coupling member 20. In this example, the first coupling member 18 includes a planetary gear set 22. The planetary gear set 22 comprises three rotational members 24, 26, 28. The first rotational member 24, which here is formed by a ring gear, is connected to the input 2. The second rotational member 26, which here is formed by a planet carrier, is connected to the first input shaft 12. The third rotational member 28, which here is formed by a sun gear, is connected to a first friction element 30. The first friction element 30 here is a friction brake B, such as a wet or dry plate friction brake, which e.g. is normally open.

The transmission ratio between the first and the second rotational members 24 and 26 is found between a value of one and two, retarding toward the output, when the third rotational member 28 is braked. In this example, the transmission ratios of the planetary gear set 22 and the transmission 8 are selected such that the lowest forward gear of the transmission system 1 can be attained by closing the brake B.

Here the planetary gear set 22 is not located in a wet space affixed to the transmission housing 10, but in this embodiment is a grease lubricated gear set.

In this example, the second coupling member 20 includes a second friction element 32. Here the second coupling member 20 is formed by a friction clutch C. The clutch C comprises a first section 34 which is connected to the input 2, and a second section 36 which is connected to the second input shaft 14. Here the clutch C is a wet or dry plate friction clutch which is normally closed by means of spring force. The second coupling member 20 may be arranged for actuation via an axial thrust bearing.

Thus, the first coupling member selectively couples the input 2 to the first input shaft 12. If the first coupling member couples the input 2 to the first input shaft 12, the first coupling member couples the input 2 to the first input shaft 12 while reducing rotational speed. Here, the rotational speed of the first input shaft 12 is reduced by a factor between more than one and two relative to a rotational speed of the input 2. The factor can e.g. be between 1.2 and 1.7, preferably between 1.3 and 1.5. The second coupling member 20 here is a direct coupling, selectively coupling the input 2 to the second input shaft 14 while maintaining rotational speed if coupled. More in general, the first coupling member 18 couples the input 2 to the first input shaft 12 at a first speed ratio, and the second coupling member 20 couples the input 2 to the second input shaft 14 at a second speed ratio, wherein the first and second speed ratios differ.

A first speed transforming gear 38 connects the first input shaft 12 and the first output shaft 16. A second speed transforming gear 40 connects the second input shaft 14 and the second output shaft 17.

As can be seen in FIG. 1, the first coupling member 18 is positioned at a first end 42 of the transmission system 1. The second coupling member 20 is positioned at a second, opposite, end 44 of the transmission system 1. Here the first end 42 is positioned at a side of the drive source A. Here the first and second speed transforming gears 38, 40 are positioned axially between the first coupling member 18 and the second coupling member 20. More in general, the first and second speed transforming gears 38, 40 are positioned axially between the first friction element 30, B, and the second friction element 32, C. This allows for a compact build of the transmission system. The transmission system can be less complex as no shaft runs through the sun wheel 28. The position of the first friction element 30 at the first end 42 allows easy cooling/lubrication and/or access. The position of the rotational members 24, 26, 28 at the first end 42 allows for easy access.

The example of FIG. 1 includes a further coupling member 46, here a friction clutch. The further coupling member 46 is located for coupling the first and second input shaft 12, 14.

The example of FIG. 1 includes a first selection coupling member 48, here a friction clutch, and a second selection coupling member 50, here a friction clutch. In this example, the first selection coupling member 48 selectively couples the first input shaft 12 to the first output shaft 16 via a reverse transmission gear 52 or via a sixth/seventh transmission gear 54. In this example, the second selection coupling member 50 selectively couples the second input shaft 14 to the second output shaft 17 via a fourth/fifth transmission gear 56 or via a first/second transmission gear 58. Here the first speed transforming gear 38 includes the reverse speed transforming gear 52, the sixth/seventh speed transforming gear 54, and a third transmission gear 60. Here the second speed transforming gear 40 includes the fourth/fifth transmission gear 56 and the first/second transmission gear 58. It will be appreciated that the reverse transmission gear 52 includes an intermediate gear wheel 53 for yielding an opposite rotational direction from the other transmission gears.

The speed transforming gears may be selected such that the first/second speed transforming gear 58 forms the first gear if the third rotational member 28 of the planetary gear set 22 is braked, the further coupling member 46 is closed to couple the first and second input shafts, and the second selection coupling member 50 is closed to couple the first/second speed transforming gear 58 to the second output shaft 17.

The speed transforming gears may be selected such that the first/second transmission gear 58 forms the second gear if the second coupling member 20 is closed, and the second selection coupling member 50 is closed to couple the first/second transmission gear 58 to the second output shaft 17.

The speed transforming gears may be selected such that the third transmission gear 60 forms the third gear if the third rotational member 28 of the planetary gear set 22 is braked, and the further coupling member 46 is closed to couple the third transmission gear 60 to the first input shaft.

The speed transforming gears may be selected such that the fourth/fifth transmission gear 56 forms the fourth gear if the third rotational member 28 of the planetary gear set 22 is braked, the further coupling member 46 is closed to couple the first and second input shafts, and the second selection coupling member 50 is closed to couple the fourth/fifth transmission gear 56 to the second output shaft 17.

The speed transforming gears may be selected such that the fourth/fifth transmission gear 56 forms the fifth gear if the second coupling member 20 is closed, the further coupling member 46 is closed to couple the first and second input shafts, and the second selection coupling member 50 is closed to couple the fourth/fifth transmission gear 56 to the second output shaft 17.

The speed transforming gears may be selected such that the sixth/seventh transmission gear 54 forms the sixth gear if the third rotational member 28 of the planetary gear set 22 is braked, and the first selection coupling member 48 is closed to couple the sixth/seventh transmission gear 54 to the first output shaft 16.

The speed transforming gears may be selected such that the sixth/seventh transmission gear 54 forms the seventh gear if the second coupling member 20 is closed and the first selection coupling member 48 is closed to couple the sixth/seventh transmission gear 54 to the first output shaft 16.

The speed transforming gears may be selected such that the reverse speed transforming gear 52 forms the reverse gear if the third rotational member 28 of the planetary gear set 22 is braked, and the first selection coupling member 48 is closed to couple the reverse transmission gear 52 to the first output shaft 16.

Figure 2:
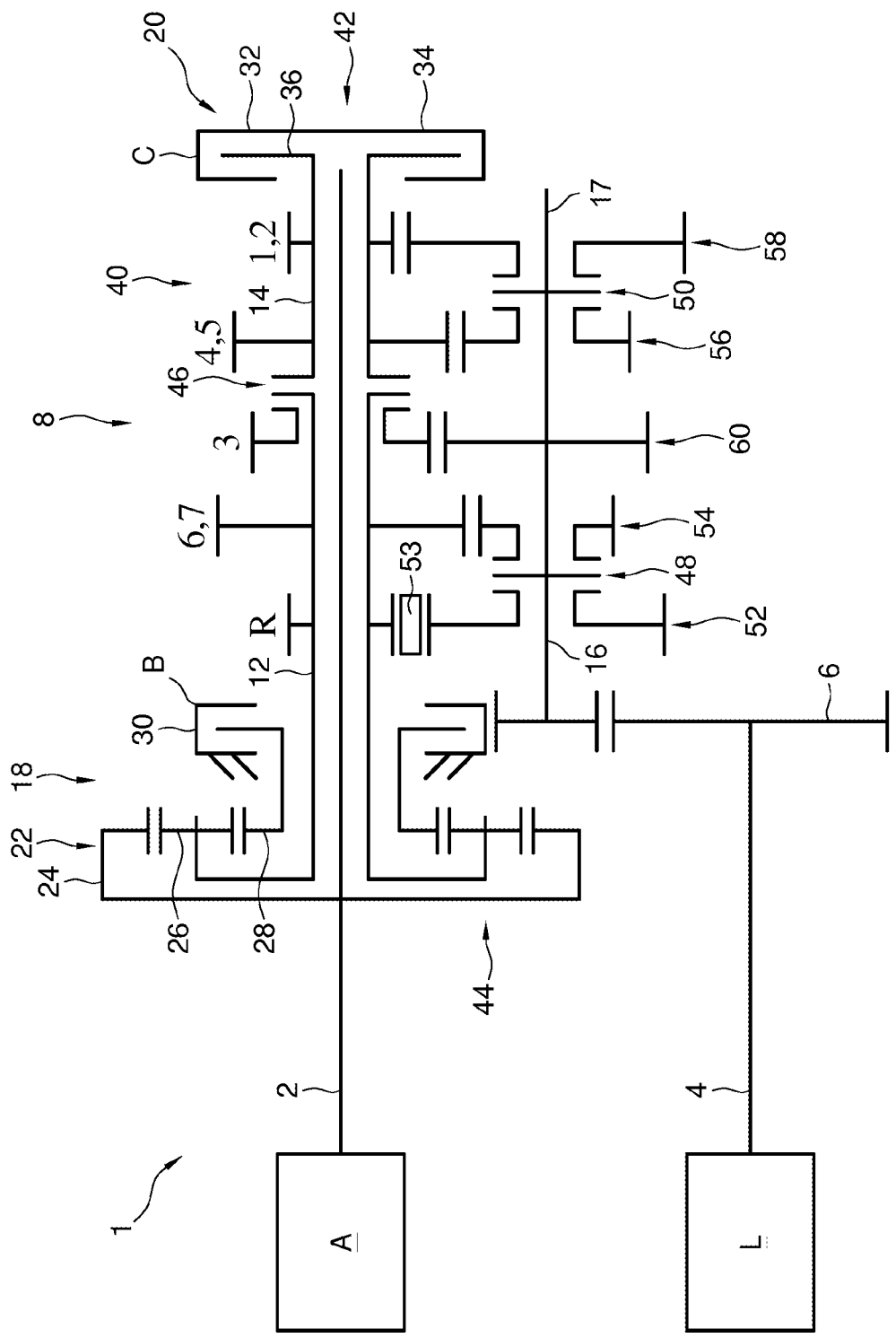
FIG. 2 shows a schematic diagram of a transmission system.

FIG. 2 shows schematic representation of a transmission system 1 for a vehicle. The transmission system 1 shown in FIG. 2 differs from the transmission system shown in FIG. 1 in that the first coupling member 18 is positioned at the second end 44 of the transmission system 1 and the second coupling member 20 is positioned at the first end 42 of the transmission system 1. In the example of FIG. 2 the first friction element 30 is positioned axially between the rotational members 24, 26, 28 and the first and second speed transforming gears 38, 40.

Figure 3:
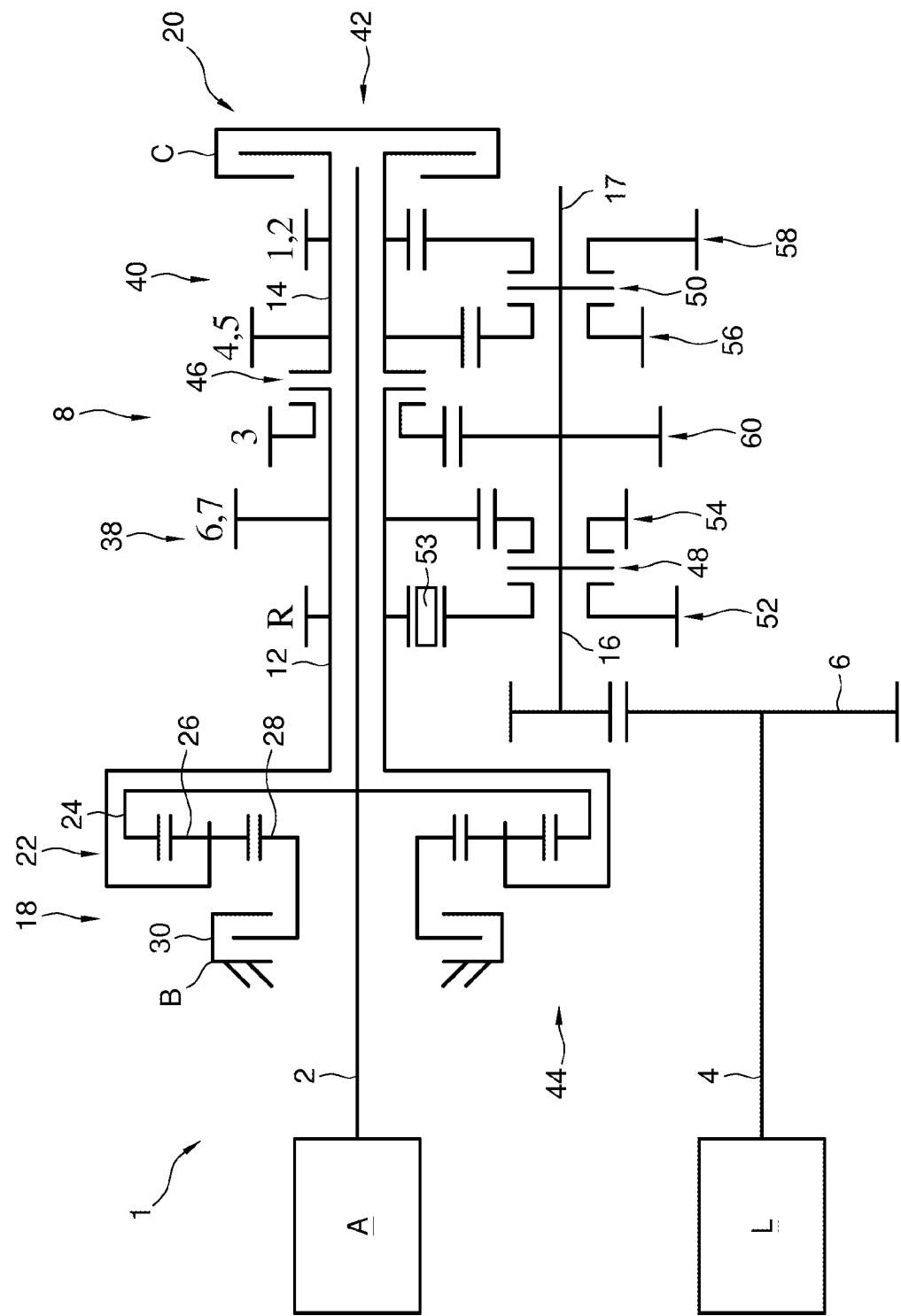
FIG. 3 shows a schematic diagram of a transmission system.

FIG. 3 shows a schematic representation of a transmission system 1 for a vehicle. The transmission system 1 shown in FIG. 3 differs from the transmission system shown in FIG. 1 in that the first coupling member 18 is positioned at the second end 44 of the transmission system 1 and the second coupling member 20 is positioned at the first end 42 of the transmission system 1. In the example of FIG. 3 the rotational members 24, 26, 28 are positioned axially between the first friction element 30 and the first and second speed transforming gears 38, 40.

Figure 4:
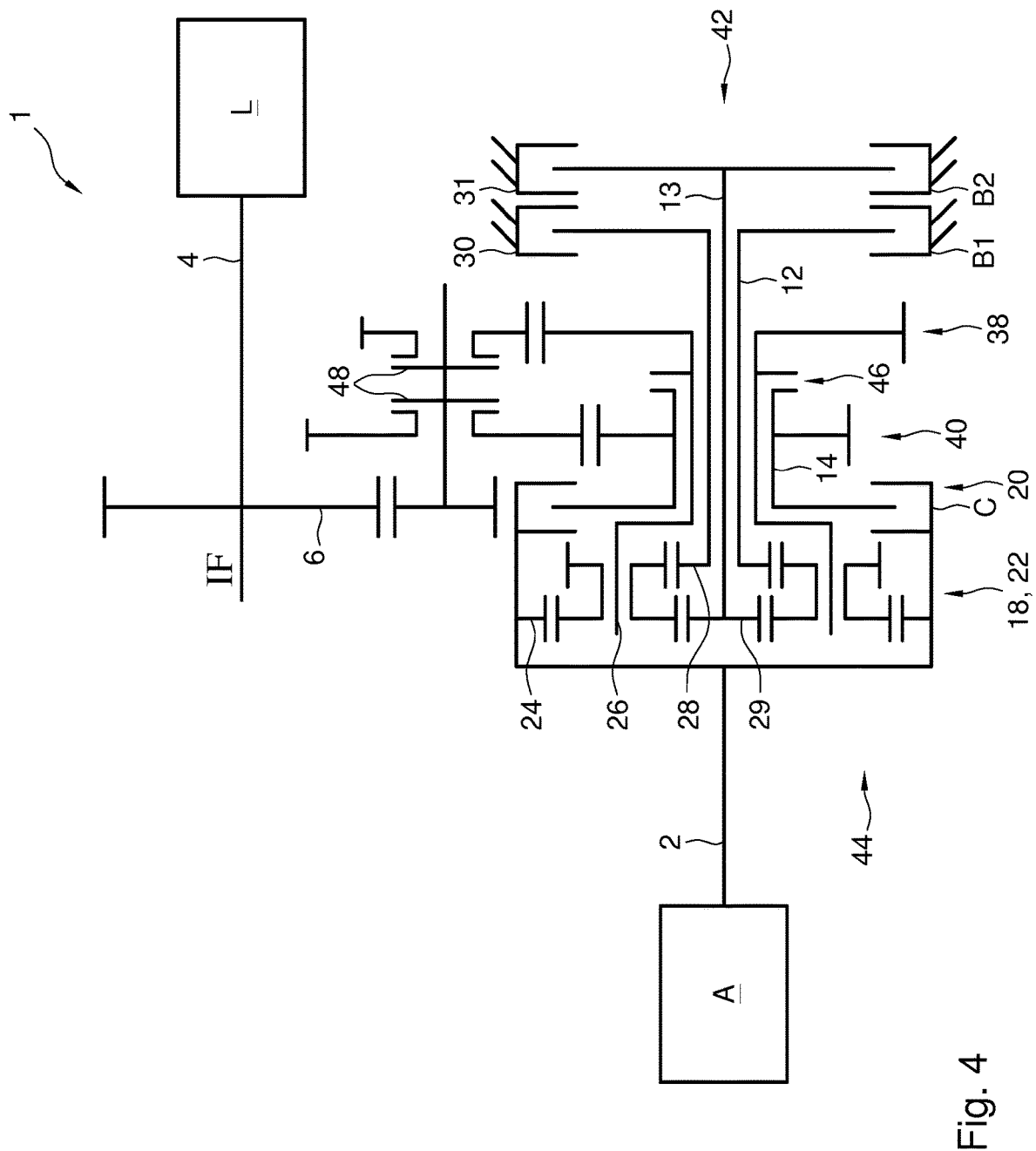
FIG. 4 shows a schematic diagram of a transmission system.

FIG. 4 shows a schematic representation of a transmission system 1 for a vehicle. In the example of FIG. 4 the first coupling member 18 of the transmission system 1 includes a planetary gear set 22. Here the planetary gear set 22 comprises four rotational members 24, 26, 28, 29. The first rotational member 24 here is formed by a ring gear. The second rotational member 26 here is formed by a planet carrier. The third rotational member 28 here is formed by a first sun gear. The fourth rotational member 29 here is formed by a second sun gear. The fourth rotational member 29 is connected to a third input shaft 13. In this example, the first rotational member 24 is connected to the input. The second rotational member 26 is connected to the first input shaft 12. The third rotational member 28 is connected to the first friction element 30. The fourth rotational member is connected to a third friction element 31. The first friction element 30 here is the first friction brake B1, such as a wet or dry plate friction brake, which e.g. is normally open. The third friction element 31 here is a second friction brake B2, such as a wet or dry plate friction brake, which e.g. is normally open.

Here the first and second speed transforming gears 38, 40 are positioned axially between on the one hand the first and third friction elements 30, 31 and on the other hand the second friction element 32. In this example, the second friction element 32 is positioned axially between the rotational members and the first friction element. It will be appreciated this is also possible in an embodiment wherein the planetary gear set includes three rotational members and one friction element.

It will be appreciated that in examples shown in FIG. 1, 2 or 3 the planetary gear set can also be provided with at least four rotational members and a first friction element 30 and a third friction element 31. In such embodiments the number of transmission gears can be ten plus a reverse gear.

In the example of FIG. 4, the first gear is formed if the first brake 30 is closed and the first selection coupling member is closed to couple the first speed transforming gear 38 to the first output shaft 16. The second gear is formed if the second brake 31 is closed and the first selection coupling member 48 is closed to couple the first speed transforming gear 38 to the first output shaft 16. The third gear is formed if the second coupling member 20 is closed, the further coupling member 46 is closed to couple the second input shaft 14 to the first input shaft 12, and the first selection coupling member is closed to couple the first speed transforming gear 38 to the first output shaft 16. The fourth gear is formed if the first brake 30 is closed, the further coupling member 46 is closed to couple the first and second input shafts 12, 14, and the and the first selection coupling member is closed to couple the second speed transforming gear 40 to the second output shaft 17. The fifth gear is formed if the second brake 31 is closed, the further coupling member 46 is closed to couple the first and second input shafts 12, 14, and the first selection coupling member 48 is closed to couple the second speed transforming gear 40 to the second output shaft 17. The sixth gear is formed if the second coupling member 20 is closed and the and the first selection coupling member is closed to couple the second speed transforming gear 40 to the second output shaft 17.

In this example a reverse gear is omitted in order not to obscure the figure. It will be appreciated that the transmission system 1 shown in FIG. 4 can include a reverse gear.

Figure 5A:
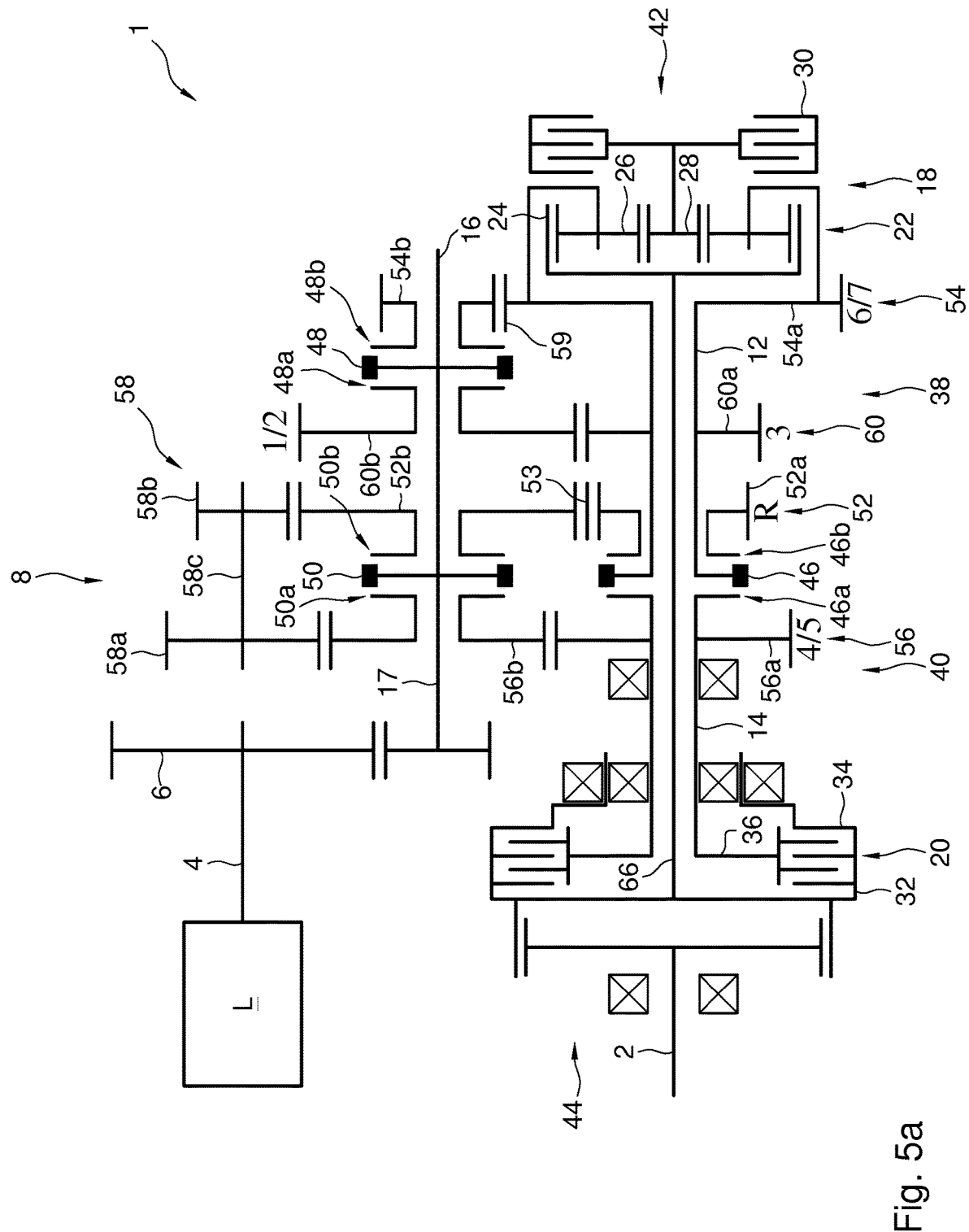
FIGS. 5a and 5b show a schematic diagram of a transmission system.
Figure 5B:
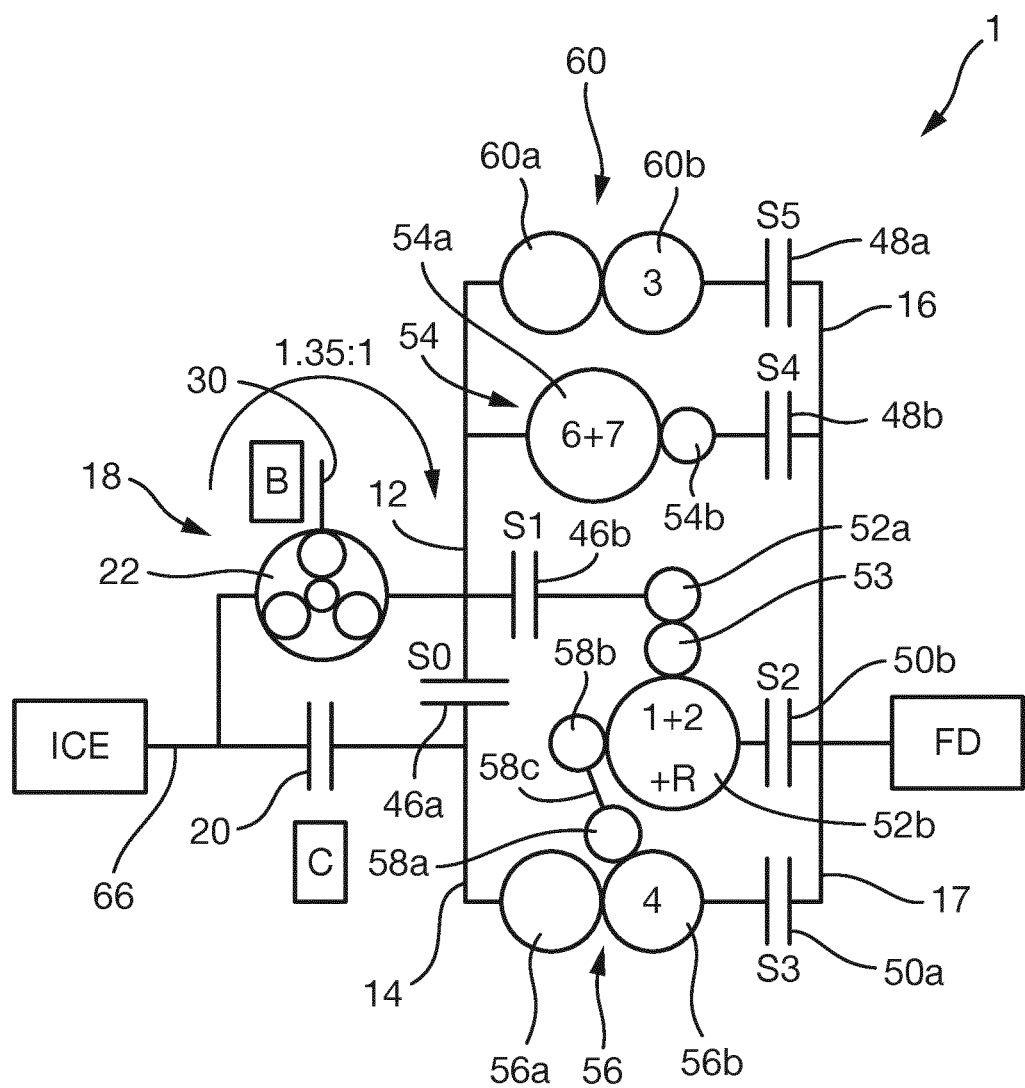

FIG. 5a shows a schematic representation of a transmission system 1 for a vehicle. FIG. 5b shows a functional representation of the transmission system of FIG. 5a. In the example of FIGS. 5a and 5b the further coupling member 46 is located for coupling 46a the first and second input shaft 12, 14. The further coupling member 46 is further arranged for selectively coupling 46b the reverse transmission gear 52 to the first input shaft 12. In the example of FIGS. 5a and 5b the first selection coupling member 48 selectively couples 48a the first input shaft 12 to the first output shaft 16 via the third transmission gear 60 or couples 48b the first input shaft 12 to the first output shaft 16 via the sixth/seventh transmission gear 54. In this example, the second selection coupling member 50 selectively couples 50a the second input shaft 14 to the second output shaft 17 via the fourth/fifth transmission gear 56 or couples 50b the first input shaft 12 to the second output shaft 17 via the reverse transmission gear 52.

Here too the first coupling member 18 selectively couples the input 2 to the first input shaft 12 while reducing rotational speed if coupled. The second coupling member 20 selectively couples the input 2 to the second input shaft 14 while maintaining rotational speed if coupled. Here, the rotational speed of the first input shaft 12 is reduced by a factor between more than one and two relative to a rotational speed of the input 2. The factor can e.g. be between 1.2 and 1.7, preferably between 1.3 and 1.5. More in general, the first coupling member 18 couples the input 2 to the first input shaft 12 at a first speed ratio, and the second coupling member 20 couples the input 2 to the second input shaft 14 at a second speed ratio, wherein the first and second speed ratios differ.

The speed transforming gears may be selected such that the first gear is formed if the third rotational member 28 of the planetary gear set 22 is braked, the further coupling member 46 is closed to couple 46a the first and second input shafts 12, 14, and the second selection coupling member 50 is closed to couple 50b the reverse transmission gear 52 to the second output shaft 17. It will be appreciated that the first gear is formed using gear wheels of the fourth/fifth transmission gear 56, the first/second transmission gear 58, and the and the reverse transmission gear 52. In this example, the first gear is formed using the first coupling member 18 and gear wheels 56a, 56b of the fourth/fifth transmission gear 56, gear wheels 58a, 58b of the first/second transmission gear 58, and gear wheel 52b of the reverse transmission gear 52.

The speed transforming gears may be selected such that the second gear is formed if the second coupling member 20 is closed, the further coupling member 46 is closed to couple 46a the first and second input shafts 12, 14, and the second selection coupling member 50 is closed to couple 50b the reverse transmission gear 52 to the second output shaft 17. It will be appreciated that the second gear is formed using gear wheels of the fourth/fifth transmission gear 56, the first/second transmission gear 58, and the reverse transmission gear 52. In this example, the second gear is formed using the second coupling member 20 and gear wheels 56a, 56b of the fourth/fifth transmission gear 56, gear wheels 58a, 58b of the first/second transmission gear 58, and gear wheel 52b of the reverse transmission gear 52.

The speed transforming gears may be selected such that the third gear is formed if the third rotational member 28 of the planetary gear set 22 is braked, and the first selection coupling member 48 is closed to couple 48a the third transmission gear 60 to the first output shaft 16. In this example, the third gear is formed using the first coupling member 18 and gear wheels 60a, 60b of the third transmission gear 60.

The speed transforming gears may be selected such that the fourth gear is formed if the third rotational member 28 of the planetary gear set 22 is braked, the further coupling member 46 is closed to couple 46a the first and second input shafts 12, 14, and the second selection coupling member 50 is closed to couple 50a the fourth/fifth transmission gear 56 to the second output shaft 17. In this example, the fourth gear is formed using the first coupling member 18 and gear wheels 56a, 56b of the fourth/fifth transmission gear 56.

The speed transforming gears may be selected such that the fifth gear is formed if the second coupling member 20 is closed, the further coupling member 46 is closed to couple 46a the first and second input shafts, and the second selection coupling member 50 is closed to couple 50a the fourth/fifth transmission gear 56 to the second output shaft 17. In this example, the fifth gear is formed using the second coupling member 20 and gear wheels 56a, 56b of the fourth/fifth transmission gear 56.

The speed transforming gears may be selected such that the sixth gear is formed if the third rotational member 28 of the planetary gear set 22 is braked, and the first selection coupling member 48 is closed to couple 48b the sixth/seventh transmission gear 54 to the first output shaft 16. In this example, the sixth gear is formed using the first coupling member 18 and gear wheels 54a, 54b of the sixth/seventh transmission gear 54.

The speed transforming gears may be selected such that the seventh gear is formed if the second coupling member 20 is closed and the first selection coupling member 48 is closed to couple 48b the sixth/seventh transmission gear 54 to the first output shaft 16. In this example, the sixth gear is formed using the second coupling member 20 and gear wheels 54a, 54b of the sixth/seventh transmission gear 54.

The speed transforming gears may be selected such that the reverse gear is formed if the third rotational member 28 of the planetary gear set 22 is braked, the further coupling member 46 is closed to couple 46b the reverse transmission gear 52 to the first input shaft 12, and the second selection coupling member 50 is closed to couple 50b the reverse transmission gear 52 to the second output shaft 16. In this example, the reverse gear is formed using the first coupling member and gear wheels 52a, 53, and 52b of the reverse transmission gear 52.

As can be seen from FIGS. 5a and 5b, in this example, the second speed transforming gear 40 includes a transmission gear, here the fourth/fifth transmission gear 56, coupled to the reverse transmission gear 52 for forming an additional gear, here the first and second gear. In this example the fourth/fifth transmission gear 56 is coupled to the reverse transmission gear 52 via additional gear wheels 58a, 58b of the first/second transmission gear 58. In this example the additional gear wheels 58a, 58b are mounted to an additional shaft 58c. The additional gear wheels 58a, 58b and additional shaft 58c form a linking gear 58. The linking gear 58 here links the fourth/fifth transmission gear 56 and the reverse transmission gear 52. Here, the linking gear 58 allows forming the first/second transmission gear. Here the additional shaft 58c is mounted radially offset from the first and second input shafts 12, 14 and the first and second output shafts 16, 17.

Here, the second rotational member 26 of the planetary gear set 22 is directly connected to a gear wheel 59, here gear wheel 54a of the sixth/seventh transmission gear 58. In this example the planetary gear set 22 is partially enclosed by the gear wheel 59. Here the gear wheel 59 is chosen to be the largest gear wheel in the transmission system 1.

Figure 6A:
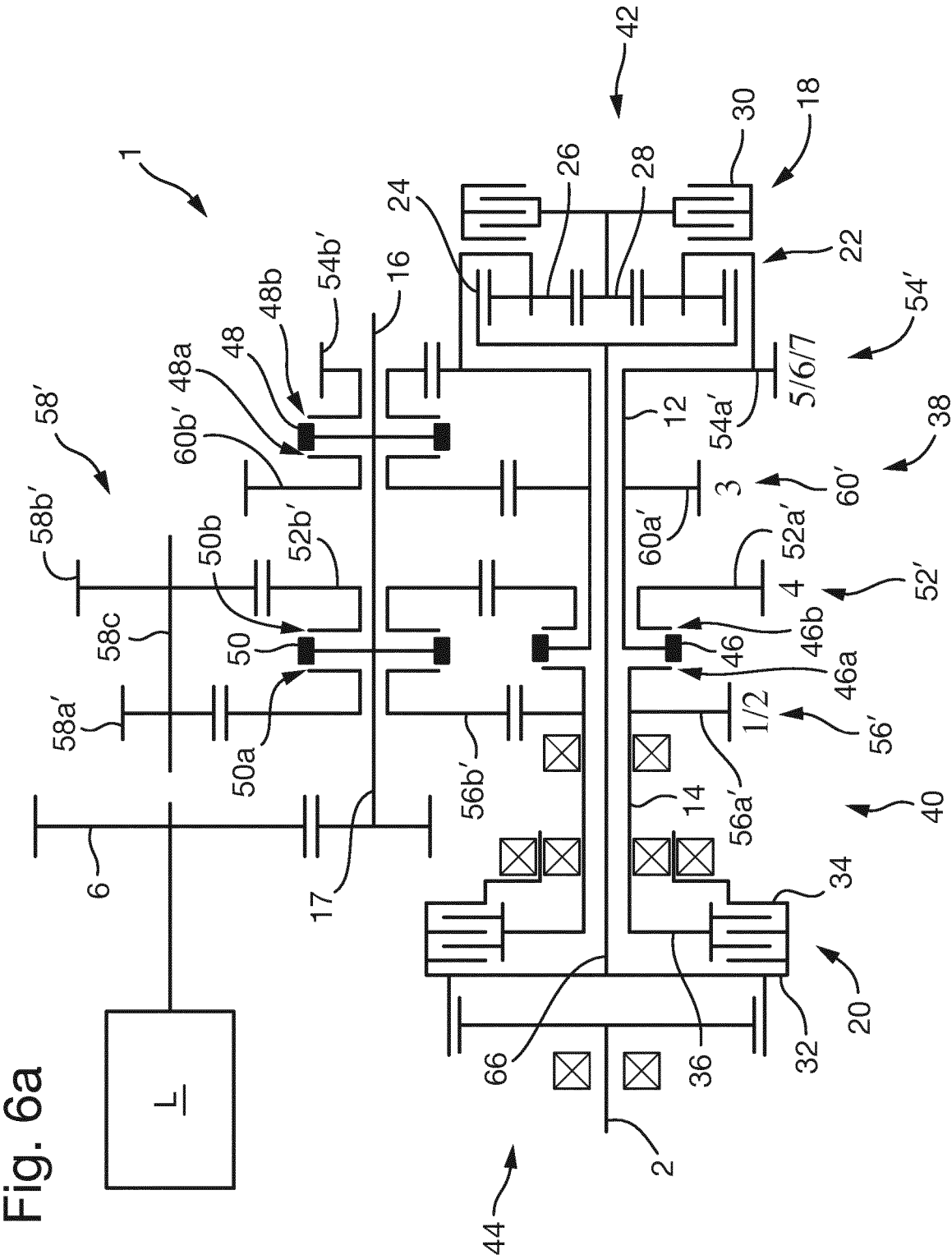
FIGS. 6a and 6b show a schematic diagram of a transmission system.
Figure 6B:
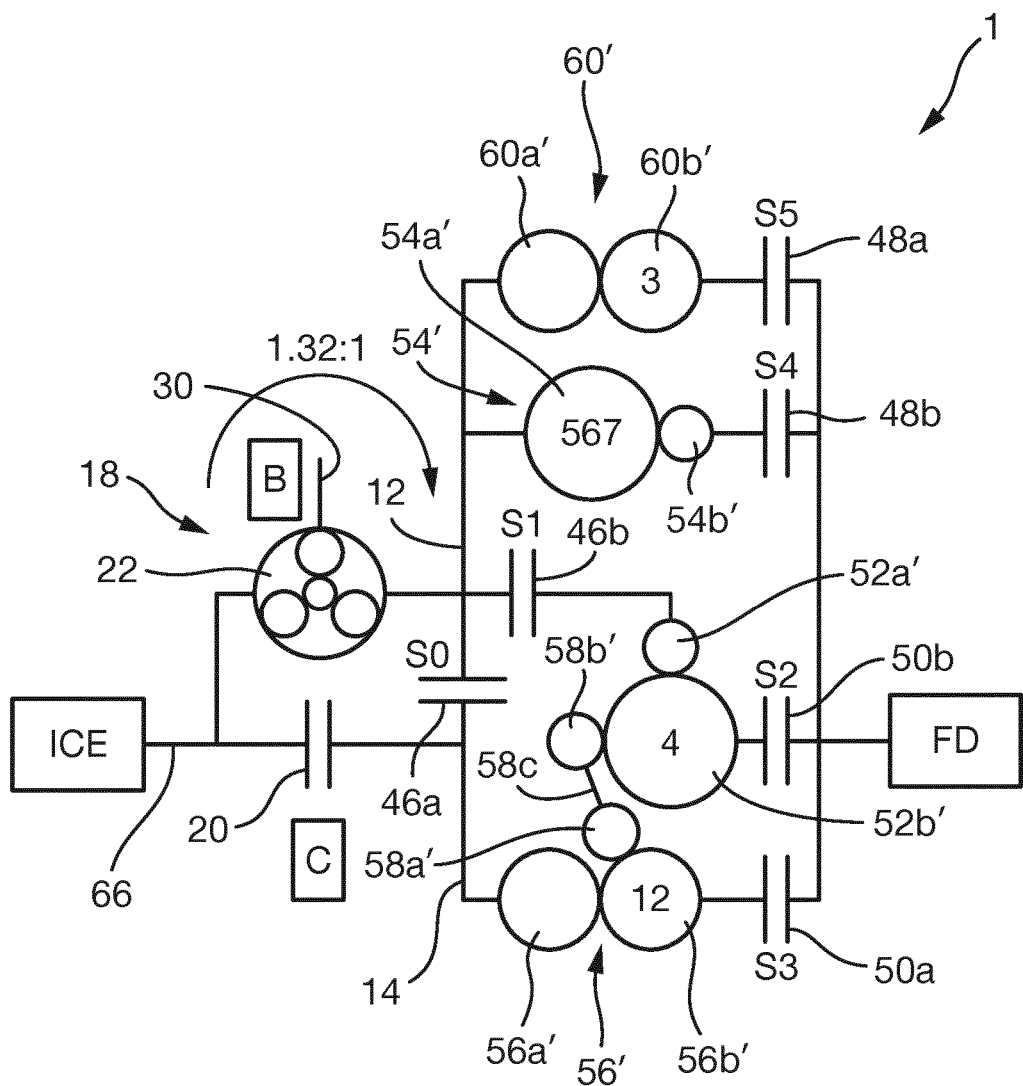

FIG. 6a shows a schematic representation of a transmission system 1 for a vehicle. FIG. 6b shows a functional representation of the transmission system of FIG. 6a. As can be seen the transmission system of FIGS. 6a and 6b differs from that of FIGS. 5a and 5b in that the intermediate gear wheel 53 has been omitted, and the gear wheels 52a' and 52b' mesh directly. As a result, gear wheels 52a', 52b' function as a forward gear, rather than as a reverse gear in this example. A reverse transmission gear can be added to the transmission system of FIGS. 6a and 6b, if desired. Such reverse gear can e.g. be designed as described in view of FIGS. 1, 2, 3, 4, 5a, 5b, or otherwise.

It will be appreciated that gear wheels are assigned to different transmission gears in FIGS. 6a, 6b than in FIGS. 5a, 5b. Therefore, for clarity, in the description of FIGS. 6a and 6b, the names of the gear wheels and transmission gears are used in relation to their function in the transmission system 1. In the FIGS. 6a, 6b, gear wheels and corresponding transmission gears are numbered according to their position in the transmission system 1. Wherein gear wheels and transmission gears in FIGS. 6a, 6b are indicated with like reference numerals as in FIGS. 5a, 5b, with additional primes.

In this example dimensions of individual gear wheels may differ from those in the example as shown in FIG. 5a. In FIG. 5a, gear wheel 52b is smaller than gear wheel 56b. It will be appreciated that in FIG. 5a gear wheels 52a, 56a, 58a, and 58b are dimensioned to match gear wheels 52b and 56b. In FIG. 6a, gear wheel 56b' is smaller than gear wheel 52b'. It will be appreciated that in FIG. 6a gear wheels and 52a', 56a', 58a', and 58b' are dimensioned to match gear wheels 52b' and 56b'.

In the example of FIGS. 6a and 6b the further coupling member 46 is located for coupling 46a the first and second input shaft 12, 14. The further coupling member 46 is further arranged for selectively coupling 46b the fourth transmission gear 52' to the first input shaft 12. In the example of FIGS. 6a and 6b the first selection coupling member 48 selectively couples 48a the first input shaft 12 to the first output shaft 16 via the third transmission gear 60' or couples 48b the first input shaft 12 to the first output shaft 16 via the fifth/sixth/seventh transmission gear 54'. In this example, the second selection coupling member 50 selectively couples 50a the second input shaft 14 to the second output shaft 17 via the first/second transmission gear 56' or couples 50b the first input shaft 12 to the second output shaft 17 via the fourth transmission gear 52'.

Here too the first coupling member 18 selectively couples the input 2 to the first input shaft 12 while reducing rotational speed if coupled. The second coupling member 20 selectively couples the input 2 to the second input shaft 14 while maintaining rotational speed if coupled. Here, the rotational speed of the first input shaft 12 is reduced by a factor between more than one and two relative to a rotational speed of the input 2. The factor can e.g. be between 1.2 and 1.7, preferably between 1.3 and 1.5. More in general, the first coupling member 18 couples the input 2 to the first input shaft 12 at a first speed ratio, and the second coupling member 20 couples the input 2 to the second input shaft 14 at a second speed ratio, wherein the first and second speed ratios differ.

Also referring to FIG. 7a, the speed transforming gears may be selected such that the first gear is formed if the third rotational member 28 of the planetary gear set 22 is braked, the further coupling member 46 is closed to couple 46b the fourth transmission gear 52' to the first input shaft 12, and the second selection coupling member 50 is closed to couple 50a the first/second transmission gear 56' to the second output shaft 17. It will be appreciated that the first gear is formed using gear wheels of the fourth transmission gear 52', and the first/second transmission gear 56'. In this example, the first gear is formed using the first coupling member 18 and gear wheels 52a', 52b' of the fourth transmission gear 52', first linking gear wheels 58a', linking shaft 58c' and second linking gear wheel 58b' of linking gear 58', and gear wheel 56b' of the first/second transmission gear 56'. It will be appreciated that a vehicle including the transmission system 1 can be launched over the brake 30 of the first coupling member 18.

For shifting from first gear to second gear, the first coupling member 18 can be decoupled and the second coupling member 20 can be coupled.

Also referring to FIG. 7b, the speed transforming gears may be selected such that the second gear is formed if the second coupling member 20 is closed, the further coupling member 46 is set to decouple the first and second input shafts 12, 14, and the second selection coupling member 50 is closed to couple 50a the first/second transmission gear 56' to the second output shaft 17. It will be appreciated that the second gear is formed using gear wheels of first/second transmission gear 56'. In this example, the first gear is formed using the second coupling member 20 and gear wheels 56a' and 56b' of the first/second transmission gear 56'.

Before shifting from second gear to third gear, the third gear may be preselected by uncoupling the fourth transmission gear 52' and the first input shaft 12 at the further coupling member 46, and by coupling 48a at the first selection coupling member 48 the third transmission gear 60' to the first output shaft 16 (see FIG. 7c). For shifting from second gear to third gear, the second coupling member 20 can be decoupled and the first coupling member 18 can be coupled.

Also referring to FIG. 7d, the speed transforming gears may be selected such that the third gear is formed if the third rotational member 28 of the planetary gear set 22 is braked, and the first selection coupling member 48 is closed to couple 48a the third transmission gear 60' to the first output shaft 16. In this example, the third gear is formed using the first coupling member 18 and gear wheels 60a' and 60b' of the third transmission gear 60'.

Figure 7E:
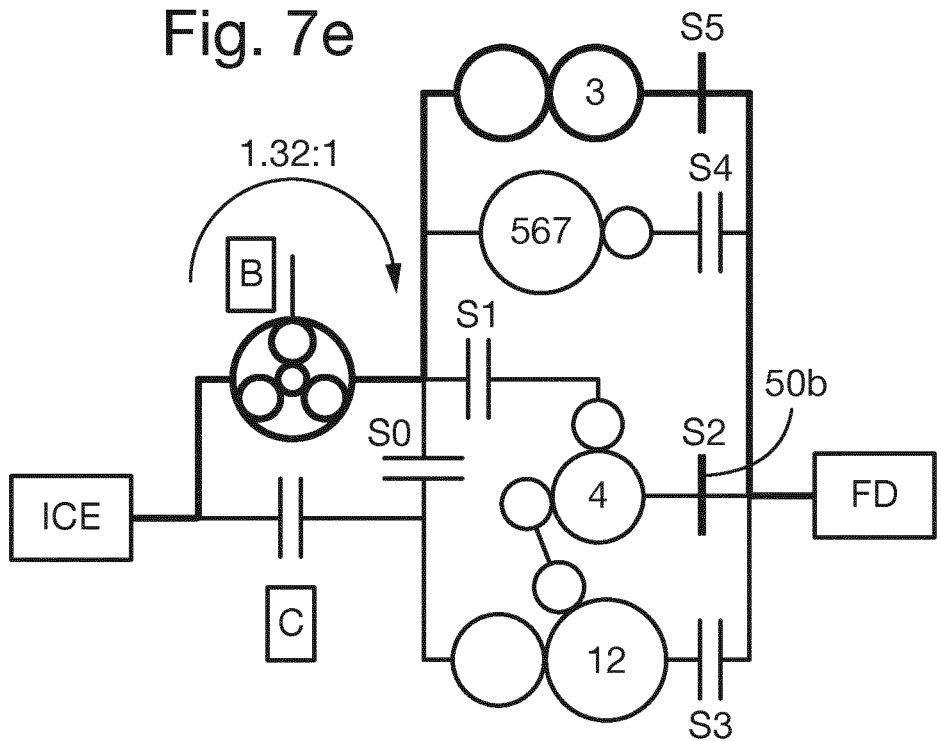

Before shifting from third gear to fourth gear, the fourth gear may be preselected by coupling 50b the fourth transmission gear 52' to the second output shaft 17 at the second selection coupling member 50 (see FIG. 7e). For shifting from third gear to fourth gear, the first coupling member 18 can be decoupled and the second coupling member 20 can be coupled.

Figure 7F:
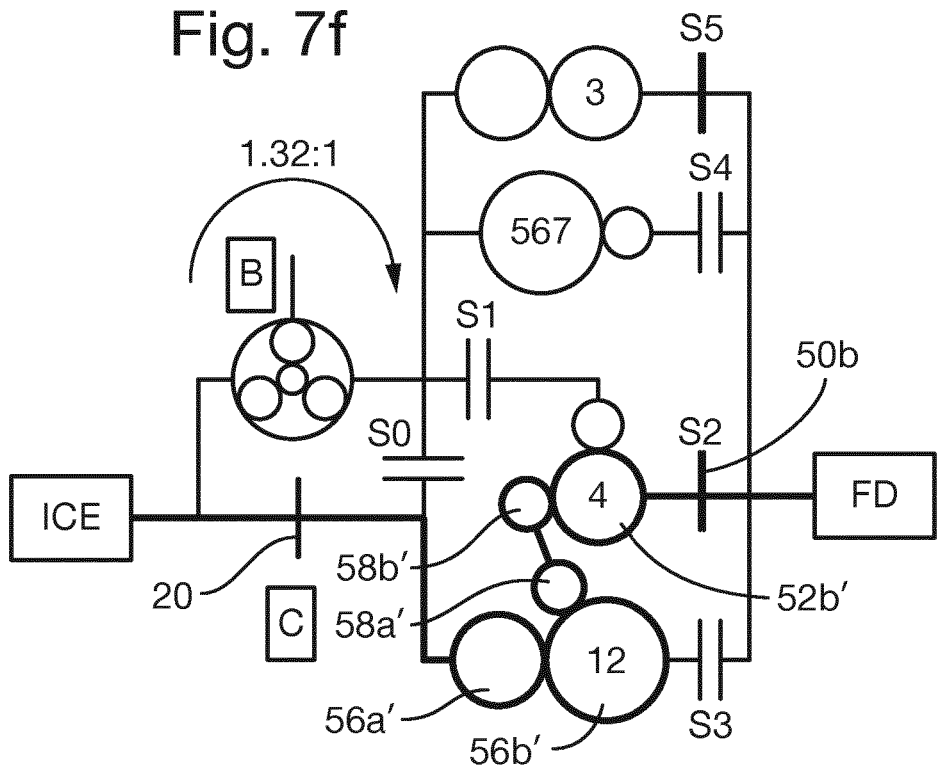

Also referring to FIG. 7f, the speed transforming gears may be selected such that the fourth gear is formed if the second coupling member 20 is closed, the further coupling member 46 is set to decouple the first and second input shafts 12, 14, and the second selection coupling member 50 is closed to couple 50b the fourth transmission gear 52' to the second output shaft 17. In this example, the fourth gear is formed using the second coupling member 20 and gear wheels 56a', 56b' of the first/second transmission gear 56', gear wheels 58a', 58b' of linking gear 58', and gear wheel 52b' of the fourth transmission gear 52'.

Before shifting from fourth gear to fifth gear, the fifth gear may be preselected by coupling 48b the fifths/sixth/seventh transmission gear 54' to the first output shaft 16 at the first selection coupling member 48 (see FIG. 7g). For shifting from fourth gear to fifth gear, the second coupling member 20 can be decoupled and the first coupling member 18 can be coupled.

Also referring to FIG. 7h, the speed transforming gears may be selected such that the fifth gear is formed if the third rotational member 28 of the planetary gear set 22 is braked, the further coupling member 46 is set to decouple the first and second input shafts 12, 14, and the first selection coupling member 48 is closed to couple 48b the fifth/sixth/seventh transmission gear 54' the first output shaft 16. In this example, the fifth gear is formed using the first coupling member 18 and gear wheels 54a', 54b' of the fifth/sixth/seventh transmission gear 54'.

Figure 7I:
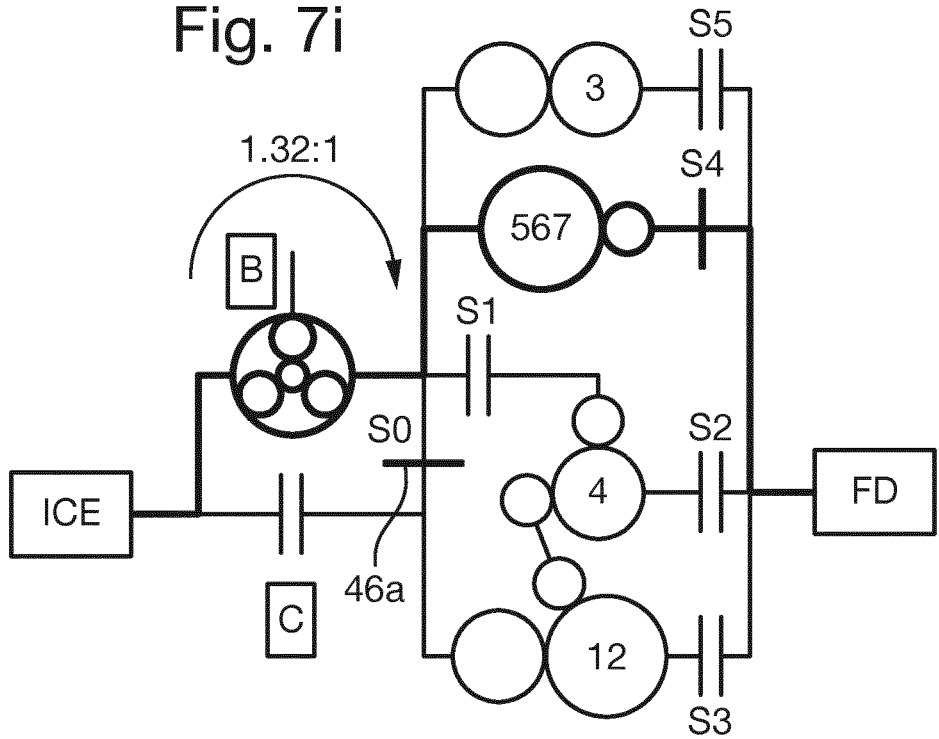

Before shifting from fifth gear to sixth gear, the sixth gear may be preselected by coupling 46a the first and second input shafts 12, 14 at the further coupling member 46, and uncoupling the fourth transmission gear 52' from the second output shaft 17 at the second selection coupling member 50 (see FIG. 7i). For shifting from fifth gear to sixth gear, the first coupling member 18 can be decoupled and the second coupling member 20 can be coupled.

Figure 7J:
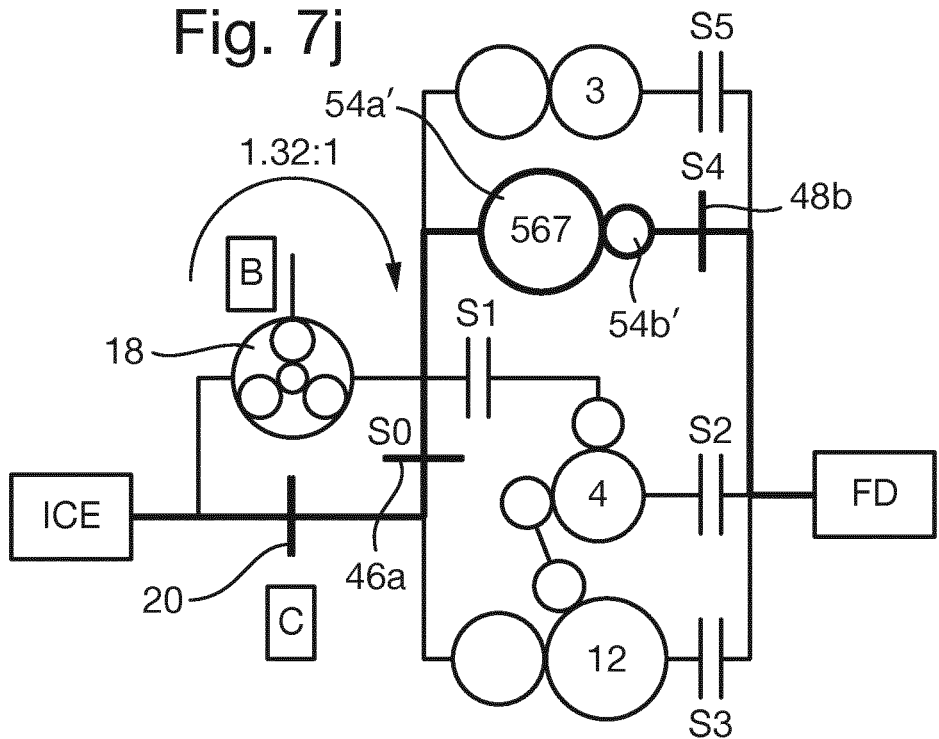

Also referring to FIG. 7j, the speed transforming gears may be selected such that the sixth gear is formed if the second coupling member 20 is closed, and the first selection coupling member 48 is closed to couple 48b the fifth/sixth/seventh transmission gear 54' to the first output shaft 16. In this example, the sixth gear is formed using the second coupling member 20 and gear wheels 54a', 54b' of the fifth/sixth/seventh transmission gear 54'.

Figure 7K:
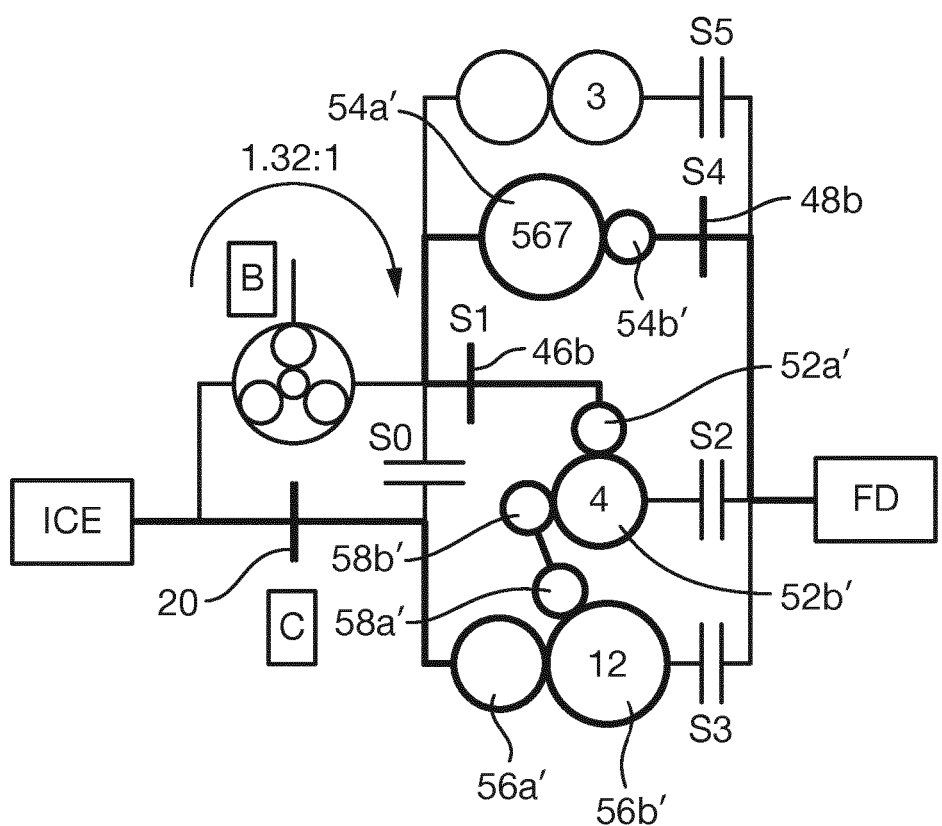

For shifting from sixth gear to seventh gear, the further coupling member 46 may be set for uncoupling the first and second input shafts 12, 14, and coupling 46b fourth transmission gear 52' to the first input shaft 12 (see FIG. 7k). The speed transforming gears may be selected such that the seventh gear is formed if the second coupling member 20 is closed, the further coupling member 46 is closed to couple 46b the fifth/sixth/seventh transmission gear 54' to the first input shaft 12, the first selection coupling member 48 is closed to couple 48b the fifth/sixth/seventh transmission gear 54' to the first output shaft 16, and the second selection coupling member 50 is set to uncouple the fourth transmission gear 52' and the first/second transmission gear 56' from the second output shaft. In this example, the seventh gear is formed using the second coupling member 20 and gear wheels 56a', 56b' of the first/second transmission gear 56', gear wheels 58a', 58b' of linking gear 58', gear wheels 52a', 52b' of the fourth transmission gear 52', and gear wheels 54a', 54b' of the fifth/sixth/seventh transmission gear 54'.

It will be appreciated that in the above, the transmission system 1 of FIGS. 6a and 6b shifting through the respective first, second, third, fourth, fifth and sixth gears is effected by alternatingly engaging the first coupling member 18 and the second coupling member 20. This allows for smooth shifting without necessitating intermediate shifts to shift to a next gear while maintaining torque.

The transmission system of FIGS. 6a and 6b also provides a number of alternative gears that could be selected if desired. Examples are shown in FIGS. 8a, 8b, 8c and 8d.

Figure 8A:
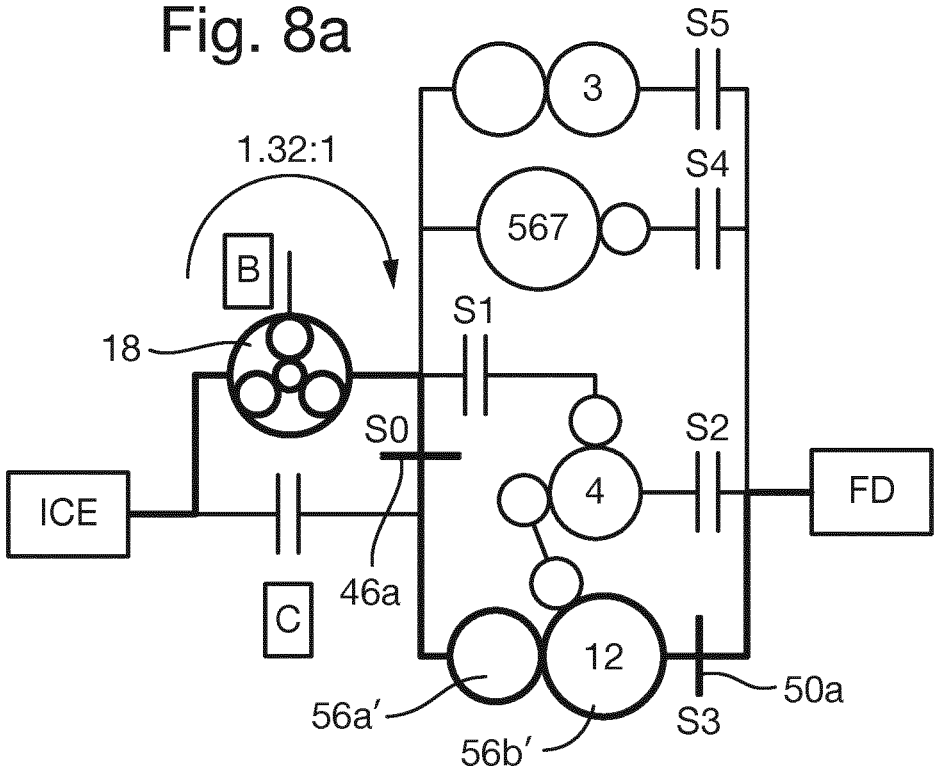
FIGS. 8a-8d show schematic diagrams of transmission systems.

FIG. 8a shows an example of a "gear one-and-a-half", i.e. a gear having a gear ratio in between first gear and second gear. This gear is formed if the third rotational member 28 of the planetary gear set 22 is braked, the further coupling member 46 is closed to couple 46a the first input shaft 12 to the second input shaft 14, and the second selection coupling member 50 is closed to couple 50a the first/second transmission gear 56' to the second output shaft 17. It will be appreciated that the gear one-and-a-half is formed using the first coupling member 18 and gear wheels 56a', 56b' of the first/second transmission gear 56'. It will be appreciated that a vehicle including the transmission system 1 can be launched over the brake 30 of the first coupling member 18 in this gear.

Figure 8B:
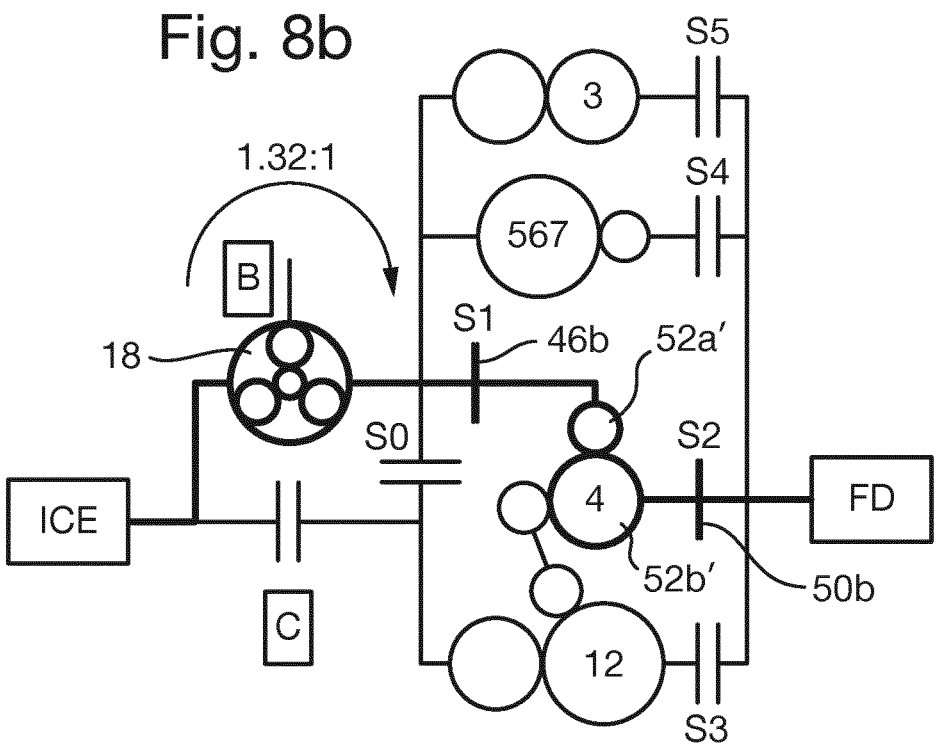

FIG. 8b shows an example of a "gear two-and-a-half", i.e. a gear having a gear ratio in between second gear and third gear. This gear is formed if the third rotational member 28 of the planetary gear set 22 is braked, the further coupling member 46 is closed to couple 46b the first input shaft 12 and fourth transmission gear 52', and the second selection coupling member 50 is closed to couple 50b the fourth transmission gear 52' to the second output shaft 17. It will be appreciated that the gear two-and-a-half is formed using the first coupling member 18 and gear wheels 52a', 52b' of the fourth transmission gear 52'.

Figure 8C:
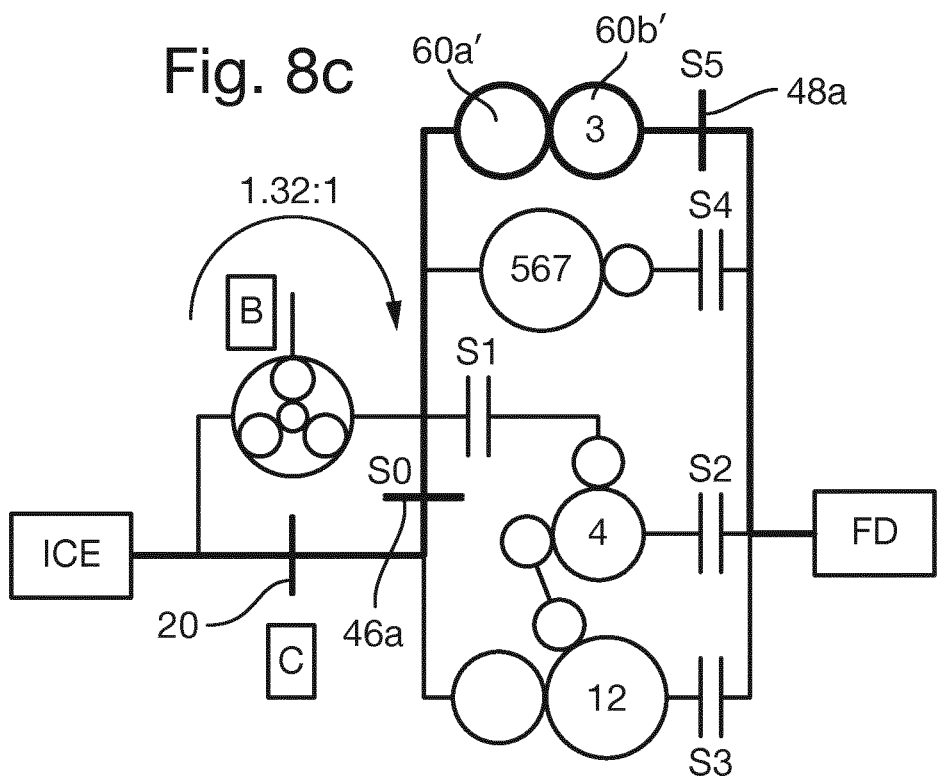

FIG. 8c shows an example of an alternative fourth gear. This gear is formed if the second coupling member 20 is closed, the further coupling member 46 is closed to couple 46a the first input shaft 12 to the second input shaft 14, and the first selection coupling member 48 is closed to couple 48a the third transmission gear 60' to the first output shaft 16. It will be appreciated that the alternative fourth gear is formed using the second coupling member 20 and gear wheels 60a', 60b' of the third transmission gear 60'.

Figure 8D:
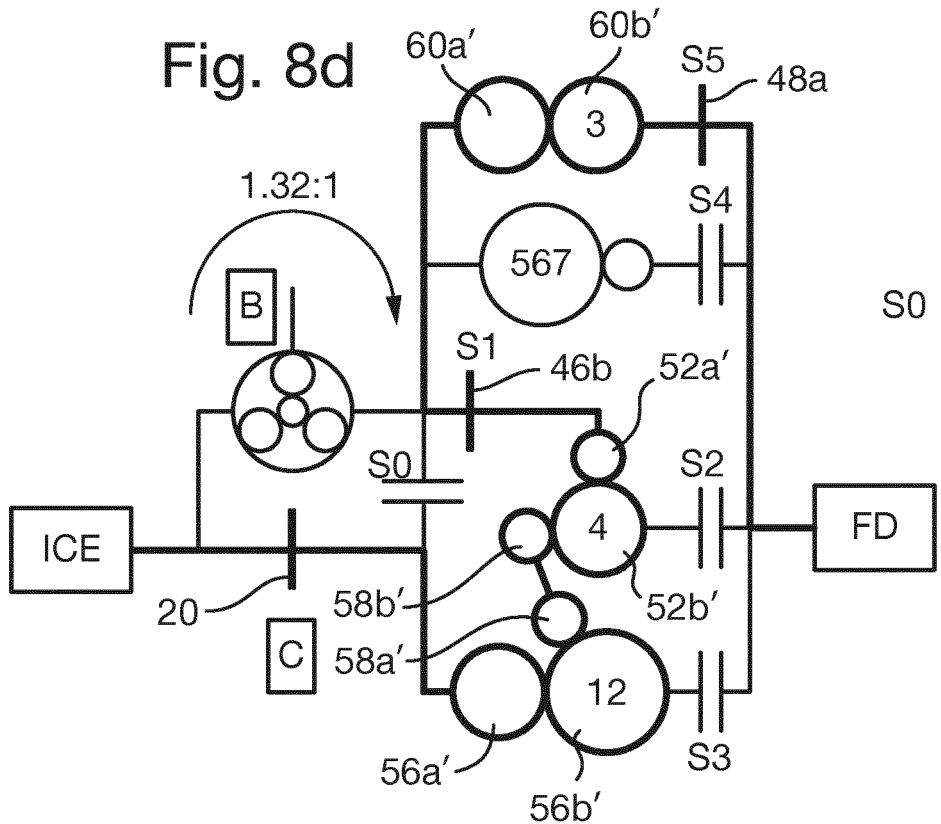

FIG. 8d shows an example of a "gear four-and-a-half", i.e. a gear having a gear ratio in between fourth gear and fifth gear. This gear is formed if the second coupling member 20 is closed, the further coupling member 46 is closed to couple 46b the first input shaft 12 and the fourth transmission gear 52', the first selection coupling member 48 is closed to couple 48a the third transmission gear 60' to the first output shaft 16, and the second selection coupling member 50 is set to uncouple the fourth transmission gear 52' and the first/second transmission gear 56' from the second output shaft 17. It will be appreciated that the gear four-and-a-half is formed using the second coupling member 20 and gear wheels 56a', 56b' of the first/second transmission gear 56', gear wheels 58a', 58b' of linking gear 58', gear wheels 52a', 52b' of the fourth transmission gear 52', and gear wheels 60a', 60b' of the third transmission gear 60'.

In the example of FIG. 6a, the first coupling member 18, including the planetary gear set 22 and the first friction element 30, is positioned at the first end 42 of the transmission system 1, and the second coupling member 20, including the second friction element 32, is positioned at a second, opposite, end 44 of the transmission system 1. It will be appreciated that this is not essential for achieving the shifting through the respective first, second, third, fourth, fifth and sixth gears by alternatingly engaging the first coupling member 18 and the second coupling member 20. Other geometrical positions of the planetary gear set 22, the first friction element 30, and the second friction element can be envisioned, such as geometrical positions as described in relation to FIGS. 1-4. It will be appreciated that it is not essential for achieving the shifting through the respective first, second, third, fourth, fifth and sixth gears by alternatingly engaging the first coupling member 18 and the second coupling member 20, that the first and second speed transforming gears 38, 40 are positioned axially between the first friction element 30, and the second friction element 32.

Figure 9A:
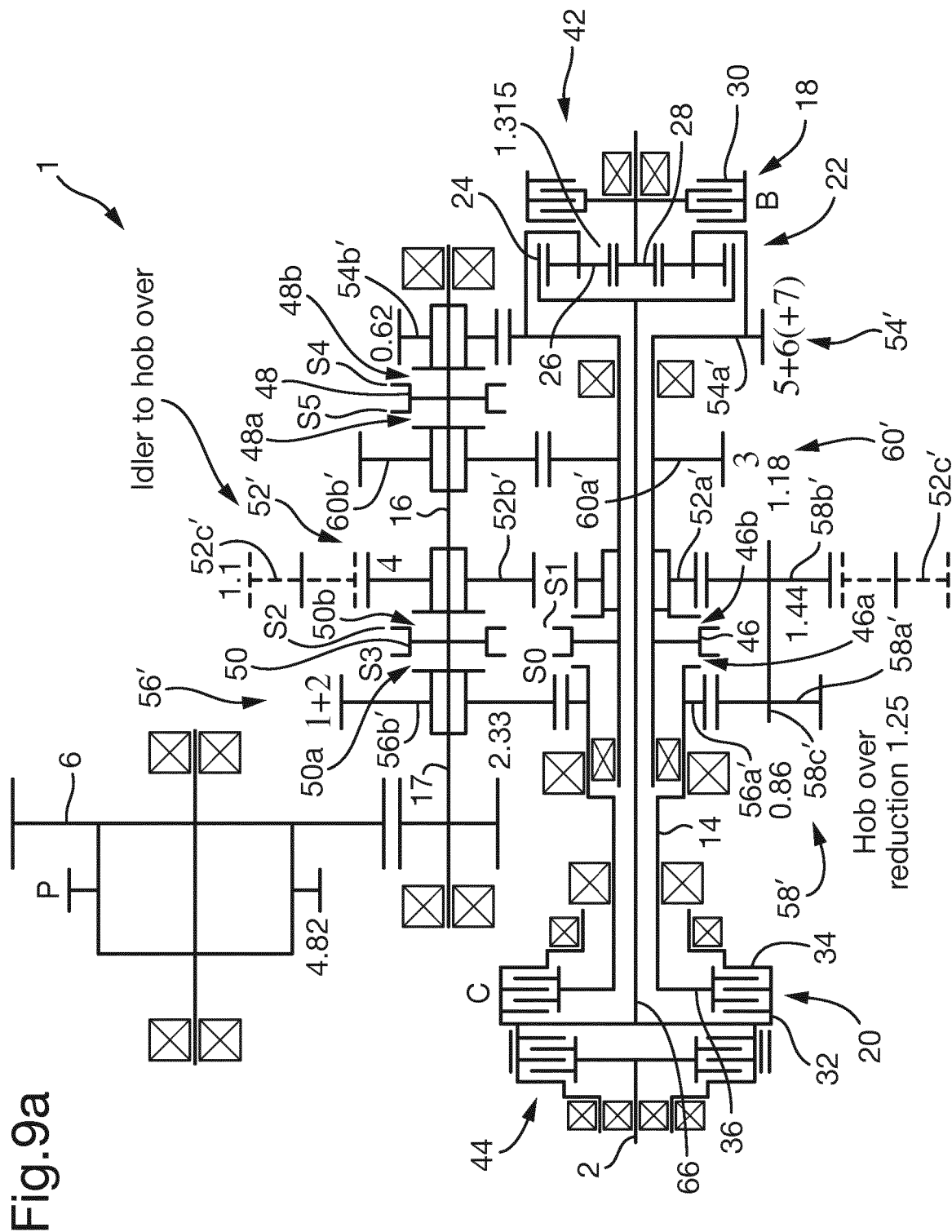

FIG. 9a shows a schematic representation of a transmission system 1 for a vehicle. FIG. 9b shows a functional representation of the transmission system of FIG. 9a. As can be seen the transmission system of FIGS. 9a and 9b differs from that of FIGS. 6a and 6b in that the first linking gear wheel 58a' meshes with the input gear wheel 56a' of the first/second transmission gear 58', the second linking gear wheel 58b' meshes with the input gear wheel 52a' of the fourth transmission gear 52', and an idler 52c' is added. A reverse transmission gear can be added to the transmission system of FIGS. 9a and 9b, if desired. Such reverse gear can e.g. be designed as described in view of FIGS. 1, 2, 3, 4, 5a, 5b, or otherwise.

In the example of FIGS. 9a and 9b the further coupling member 46 is located for coupling 46a the first and second input shaft 12, 14. The further coupling member 46 is further arranged for selectively coupling 46b the fourth transmission gear 52' to the first input shaft 12. In the example of FIGS. 9a and 9b the first selection coupling member 48 selectively couples 48a the first input shaft 12 to the first output shaft 16 via the third transmission gear 60' or couples 48b the first input shaft 12 to the first output shaft 16 via the fifth/sixth/seventh transmission gear 54'. In this example, the second selection coupling member 50 selectively couples 50a the second input shaft 14 to the second output shaft 17 via the first/second transmission gear 56' or couples 50b the first input shaft 12 to the second output shaft 17 via the fourth transmission gear 52'.

Here too the first coupling member 18 selectively couples the input 2 to the first input shaft 12 while reducing rotational speed if coupled. The second coupling member 20 selectively couples the input 2 to the second input shaft 14 while maintaining rotational speed if coupled. Here, the rotational speed of the first input shaft 12 is reduced by a factor between more than one and two relative to a rotational speed of the input 2. The factor can e.g. be between 1.2 and 1.7, preferably between 1.3 and 1.5. More in general, the first coupling member 18 couples the input 2 to the first input shaft 12 at a first speed ratio, and the second coupling member 20 couples the input 2 to the second input shaft 14 at a second speed ratio, wherein the first and second speed ratios differ.

Also referring to FIG. 10a, the speed transforming gears may be selected such that the first gear is formed if the third rotational member 28 of the planetary gear set 22 is braked, the further coupling member 46 is closed to couple 46b the fourth transmission gear 52' to the first input shaft 12, and the second selection coupling member 50 is closed to couple 50a the first/second transmission gear 56' to the second output shaft 17. It will be appreciated that the first gear is formed using gear wheels of the fourth transmission gear 52', and the first/second transmission gear 56'. In this example, the first gear is formed using the first coupling member 18 and gear wheel 52a', of the fourth transmission gear 52', first linking gear wheels 58a', linking shaft 58c' and second linking gear wheel 58b' of linking gear 58', and gear wheels 56a', 56b' of the first/second transmission gear 56'. It will be appreciated that a vehicle including the transmission system 1 can be launched over the brake 30 of the first coupling member 18.

For shifting from first gear to second gear, the first coupling member 18 can be decoupled and the second coupling member 20 can be coupled.

Also referring to FIG. 10b, the speed transforming gears may be selected such that the second gear is formed if the second coupling member 20 is closed, the further coupling member 46 is set to decouple the first and second input shafts 12, 14, and the second selection coupling member 50 is closed to couple 50a the first/second transmission gear 56' to the second output shaft 17. It will be appreciated that the second gear is formed using gear wheels of first/second transmission gear 56'. In this example, the first gear is formed using the second coupling member 20 and gear wheels 56a' and 56b' of the first/second transmission gear 56'.

Figure 10C:
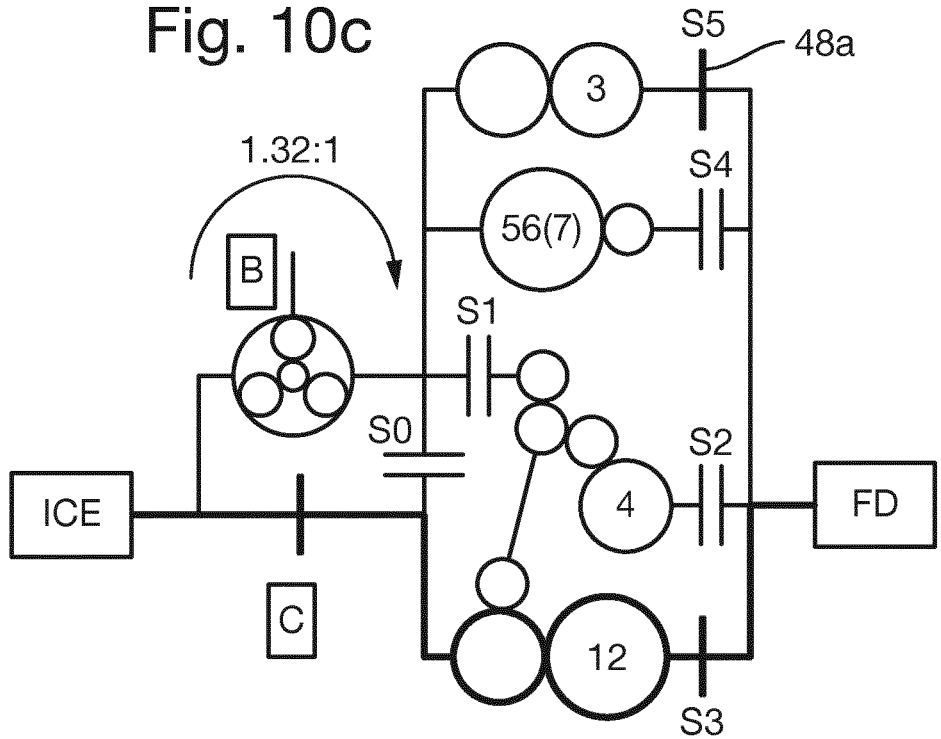

Before shifting from second gear to third gear, the third gear may be preselected by uncoupling the fourth transmission gear 52' and the first input shaft 12 at the further coupling member 46, and by coupling 48a at the first selection coupling member 48 the third transmission gear 60' to the first output shaft 16 (see FIG. 10c). For shifting from second gear to third gear, the second coupling member 20 can be decoupled and the first coupling member 18 can be coupled.

Figure 10D:
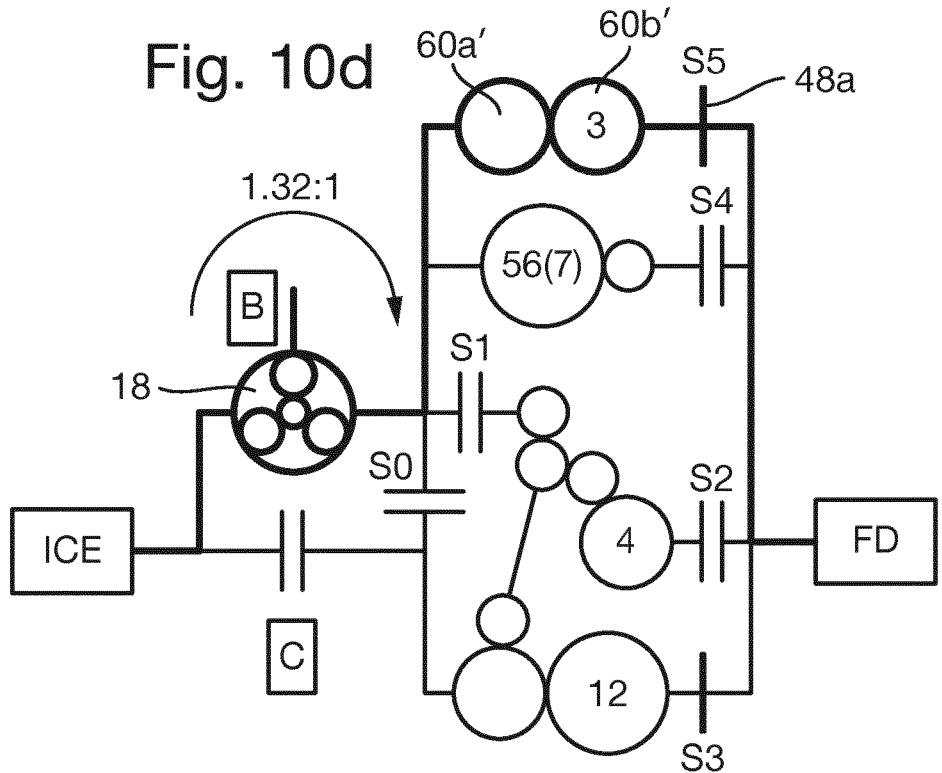

Also referring to FIG. 10d, the speed transforming gears may be selected such that the third gear is formed if the third rotational member 28 of the planetary gear set 22 is braked, and the first selection coupling member 48 is closed to couple 48*a* the third transmission gear 60' to the first output shaft 16. In this example, the third gear is formed using the first coupling member 18 and gear wheels 60*a*' and 60*b*' of the third transmission gear 60'.

Figure 10E:
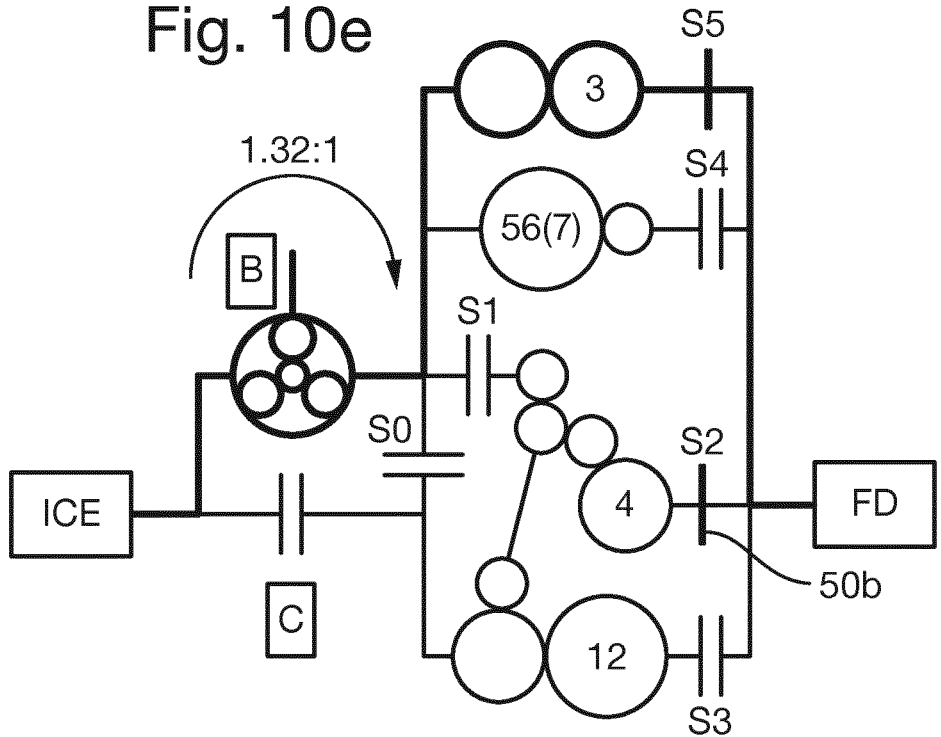

Before shifting from third gear to fourth gear, the fourth gear may be preselected by coupling 50*b* the fourth transmission gear 52' to the second output shaft 17 at the second selection coupling member 50 (see FIG. 10*e*). For shifting from third gear to fourth gear, the first coupling member 18 can be decoupled and the second coupling member 20 can be coupled.

Figure 10F:
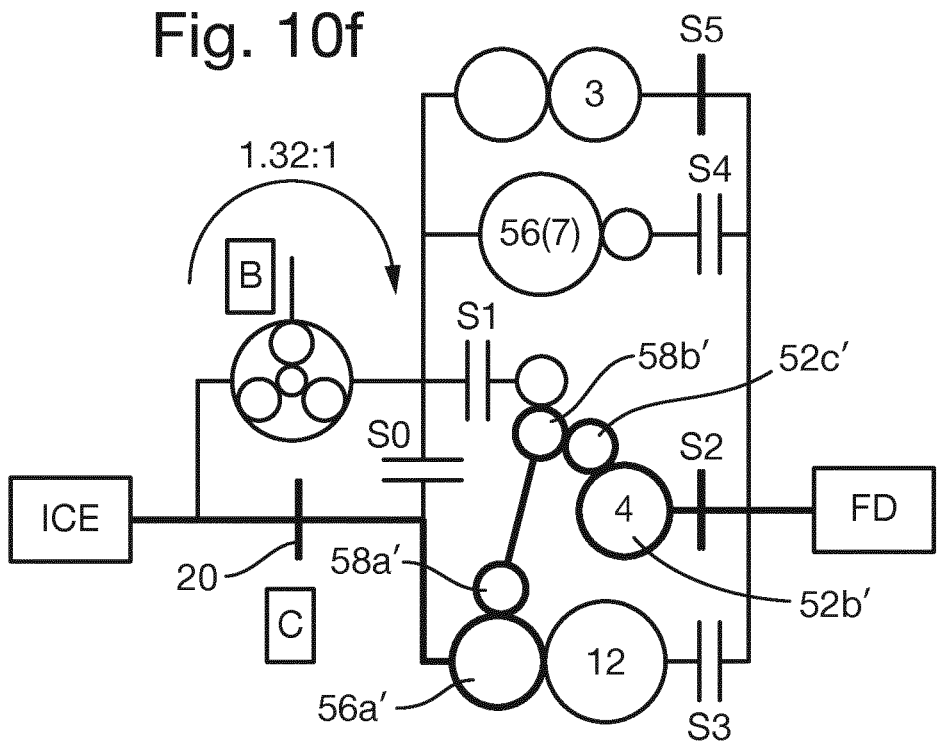

Also referring to FIG. 10*f*, the speed transforming gears may be selected such that the fourth gear is formed if the second coupling member 20 is closed, the further coupling member 46 is set to decouple the first and second input shafts 12, 14, and the second selection coupling member 50 is closed to couple 50*b* the fourth transmission gear 52' to the second output shaft 17. In this example, the fourth gear is formed using the second coupling member 20 and gear wheel 56*a*' of the first/second transmission gear 56', gear wheels 58*a*', 58*b*' of linking gear 58', and gear wheels 52*c*', 52*b*' of the fourth transmission gear 52'.

Before shifting from fourth gear to fifth gear, the fifth gear may be preselected by coupling 48*b* the fifths/sixth/seventh transmission gear 54' to the first output shaft 16 at the first selection coupling member 48 (see FIG. 10*g*). For shifting from fourth gear to fifth gear, the second coupling member 20 can be decoupled and the first coupling member 18 can be coupled.

Figure 10I:
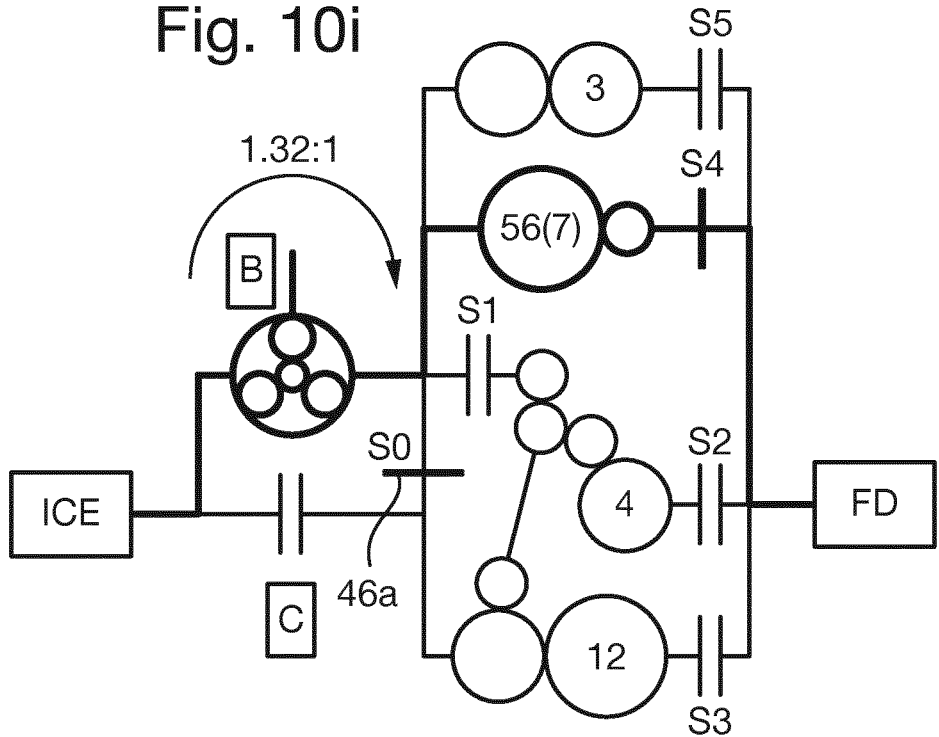

Also referring to FIG. 10*h*, the speed transforming gears may be selected such that the fifth gear is formed if the third rotational member 28 of the planetary gear set 22 is braked, the further coupling member 46 is set to decouple the first and second input shafts 12, 14, and the first selection coupling member 48 is closed to couple 48*b* the fifth/sixth/seventh transmission gear 54' the first output shaft 16. In this example, the fifth gear is formed using the first coupling member 18 and gear wheels 54*a*', 54*b*' of the fifth/sixth/seventh transmission gear 54'. Before shifting from fifth gear to sixth gear, the sixth gear may be preselected by coupling 46*a* the first and second input shafts 12, 14 at the further coupling member 46, and uncoupling the fourth transmission gear 52' from the second output shaft 17 at the second selection coupling member 50 (see FIG. 10*i*). For shifting from fifth gear to sixth gear, the first coupling member 18 can be decoupled and the second coupling member 20 can be coupled.

Figure 10J:
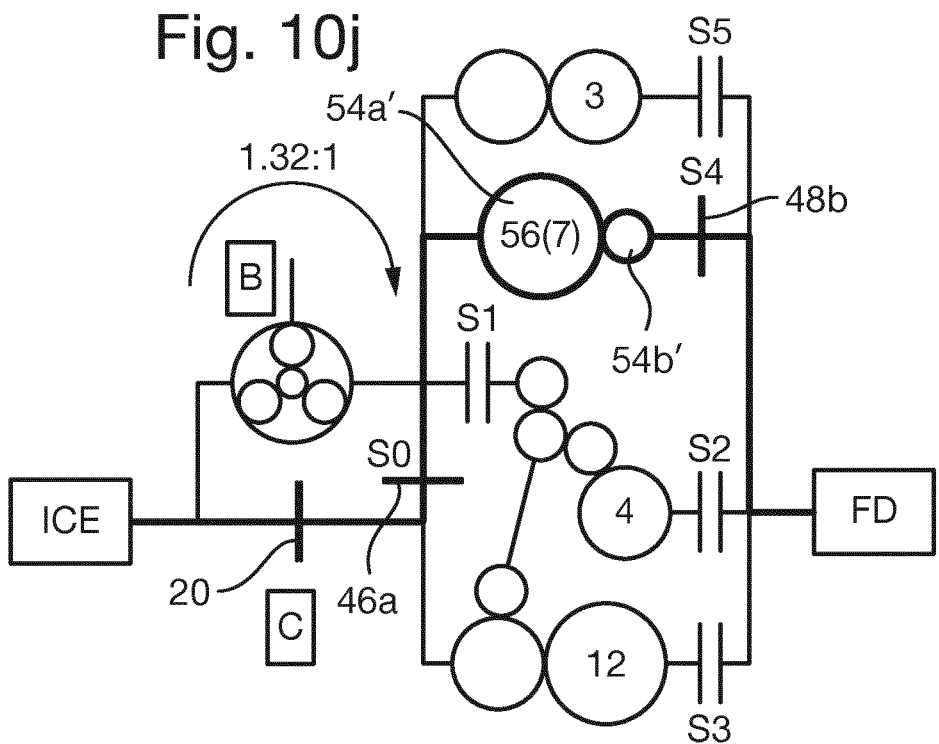

Also referring to FIG. 10*j*, the speed transforming gears may be selected such that the sixth gear is formed if the second coupling member 20 is closed, and the first selection coupling member 48 is closed to couple 48*b* the fifth/sixth/seventh transmission gear 54' to the first output shaft 16. In this example, the sixth gear is formed using the second coupling member 20 and gear wheels 54*a*', 54*b*' of the fifth/sixth/seventh transmission gear 54'.

Figure 10K:
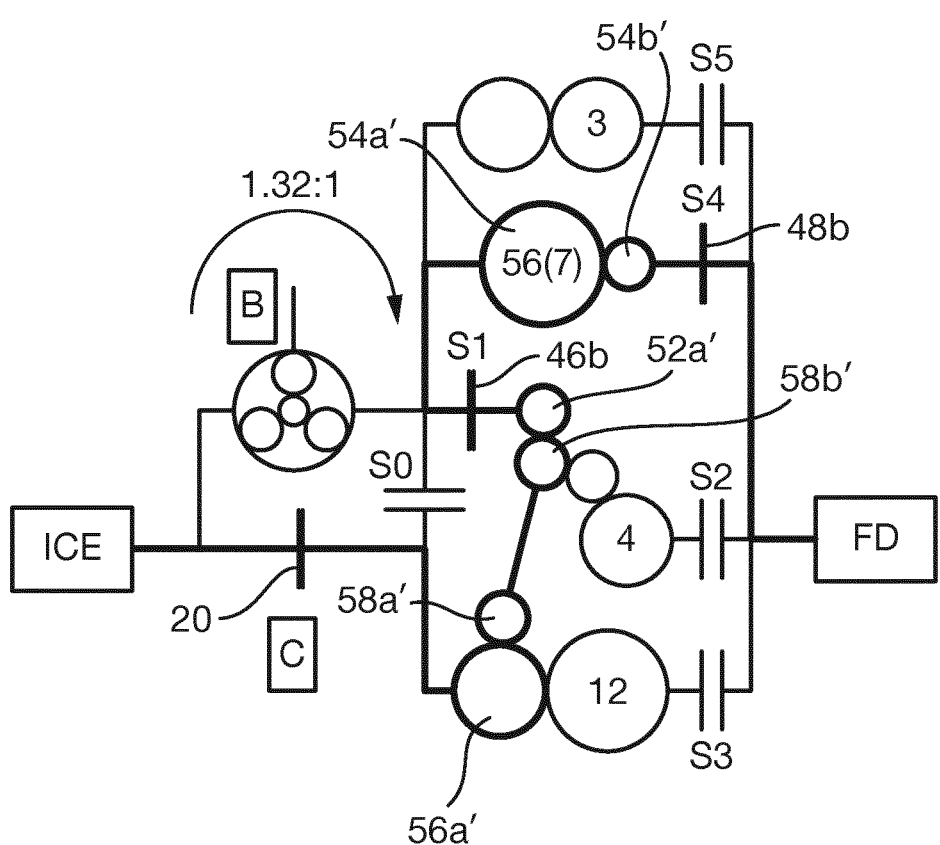

For shifting from sixth gear to seventh gear, the further coupling member 46 may be set for uncoupling the first and second input shafts 12, 14, and coupling 46*b* fourth transmission gear 52' to the first input shaft 12 (see FIG. 10*k*). The speed transforming gears may be selected such that the seventh gear is formed if the second coupling member 20 is closed, the further coupling member 46 is closed to couple 46*b* the fifth/sixth/seventh transmission gear 54' to the first input shaft 12, the first selection coupling member 48 is closed to couple 48*b* the fifth/sixth/seventh transmission gear 54' to the first output shaft 16, and the second selection coupling member 50 is set to uncouple the fourth transmission gear 52' and the first/second transmission gear 56' from the second output shaft. In this example, the seventh gear is formed using the second coupling member 20 and gear wheels 56*a*' of the first/second transmission gear 56', gear wheels 58*a*', 58*b*' of linking gear 58', gear wheels 52*c*', 52*a*' of the fourth transmission gear 52', and gear wheels 54*a*', 54*b*' of the fifth/sixth/seventh transmission gear 54'.

It will be appreciated that in the above, the transmission system 1 of FIGS. 9*a* and 9*b* shifting through the respective first, second, third, fourth, fifth and sixth gears is effected by alternatingly engaging the first coupling member 18 and the second coupling member 20. This allows for smooth shifting without necessitating intermediate shifts to shift to a next gear while maintaining torque.

The transmission system of FIGS. 9*a* and 9*b* also provides a number of alternative gears that could be selected if desired. Examples are shown in FIGS. 11*a*, 11*b*, 11*c* and 11*d*.

Figure 11A:
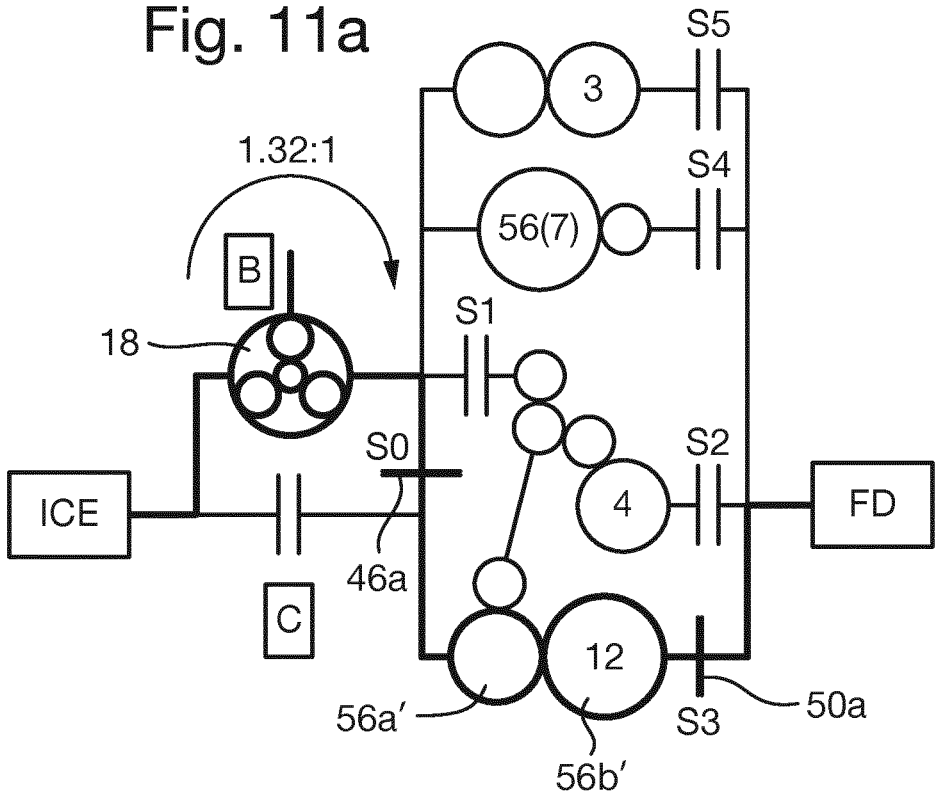

FIG. 11*a* shows an example of a "gear one-and-a-half", i.e. a gear having a gear ratio in between first gear and second gear. This gear is formed if the third rotational member 28 of the planetary gear set 22 is braked, the further coupling member 46 is closed to couple 46*a* the first input shaft 12 to the second input shaft 14, and the second selection coupling member 50 is closed to couple 50*a* the first/second transmission gear 56' to the second output shaft 17. It will be appreciated that the gear one-and-a-half is formed using the first coupling member 18 and gear wheels 56*a*', 56*b*' of the first/second transmission gear 56'. It will be appreciated that a vehicle including the transmission system 1 can be launched over the brake 30 of the first coupling member 18 in this gear.

Figure 11B:
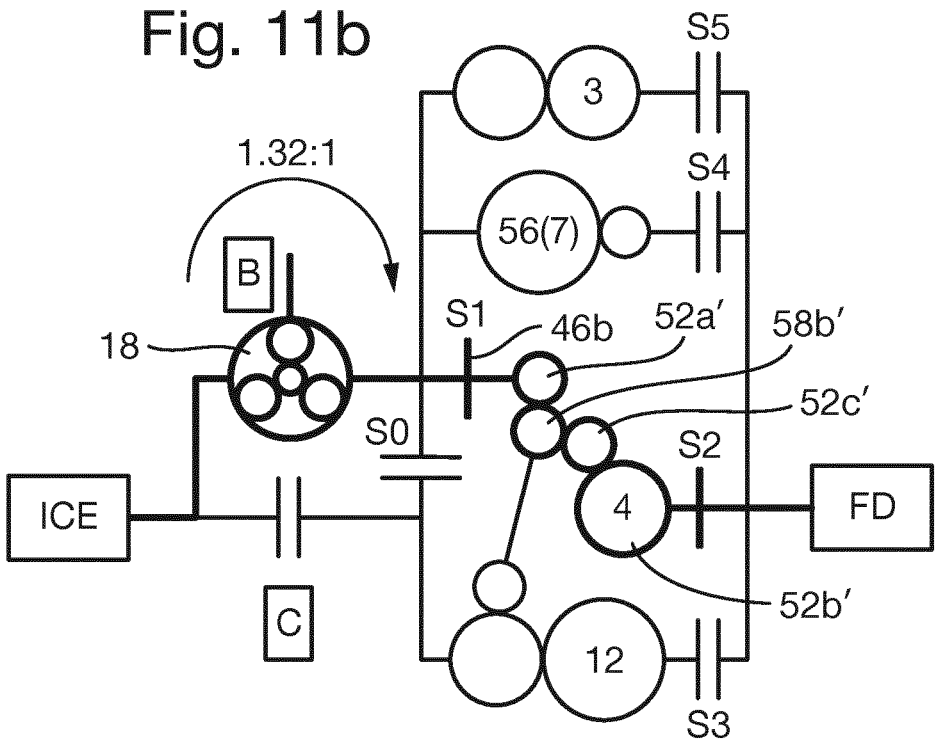

FIG. 11*b* shows an example of a "gear two-and-a-half", i.e. a gear having a gear ratio in between second gear and third gear. This gear is formed if the third rotational member 28 of the planetary gear set 22 is braked, the further coupling member 46 is closed to couple 46*b* the first input shaft 12 and fourth transmission gear 52', and the second selection coupling member 50 is closed to couple 50*b* the fourth transmission gear 52' to the second output shaft 17. It will be appreciated that the gear two-and-a-half is formed using the first coupling member 18 and gear wheels 52*a*', 52*c*', 52*b*' of the fourth transmission gear 52' and gear wheel, 58*b*' of linking gear 58'.

FIG. 11*c* shows an example of an alternative fourth gear. This gear is formed if the second coupling member 20 is closed, the further coupling member 46 is closed to couple 46*a* the first input shaft 12 to the second input shaft 14, and the first selection coupling member 48 is closed to couple 48*a* the third transmission gear 60' to the first output shaft 16. It will be appreciated that the alternative fourth gear is formed using the second coupling member 20 and gear wheels 60*a*', 60*b*' of the third transmission gear 60'.

FIG. 11*d* shows an example of a "gear four-and-a-half", i.e. a gear having a gear ratio in between fourth gear and fifth gear. This gear is formed if the second coupling member 20 is closed, the further coupling member 46 is closed to couple 46*b* the first input shaft 12 and the fourth transmission gear 52', the first selection coupling member 48 is closed to couple 48*a* the third transmission gear 60' to the first output shaft 16, and the second selection coupling member 50 is set to uncouple the fourth transmission gear 52' and the first/second transmission gear 56' from the second output shaft 17. It will be appreciated that the gear four-and-a-half is formed using the second coupling member 20 and gear wheel 56a'' of the first/second transmission gear 56', gear wheels 58a', 58b' of linking gear 58', gear wheel 52a' of the fourth transmission gear 52', and gear wheels 60a', 60b' of the third transmission gear 60'.

In the example of FIG. 9a, the first coupling member 18, including the planetary gear set 22 and the first friction element 30, is positioned at the first end 42 of the transmission system 1, and the second coupling member 20, including the second friction element 32, is positioned at a second, opposite, end 44 of the transmission system 1. It will be appreciated that this is not essential for achieving the shifting through the respective first, second, third, fourth, fifth and sixth gears by alternatingly engaging the first coupling member 18 and the second coupling member 20. Other geometrical positions of the planetary gear set 22, the first friction element 30, and the second friction element can be envisioned, such as geometrical positions as described in relation to FIGS. 1-4. It will be appreciated that it is not essential for achieving the shifting through the respective first, second, third, fourth, fifth and sixth gears by alternatingly engaging the first coupling member 18 and the second coupling member 20, that the first and second speed transforming gears 38, 40 are positioned axially between the first friction element 30, and the second friction element 32.

Figure 12:
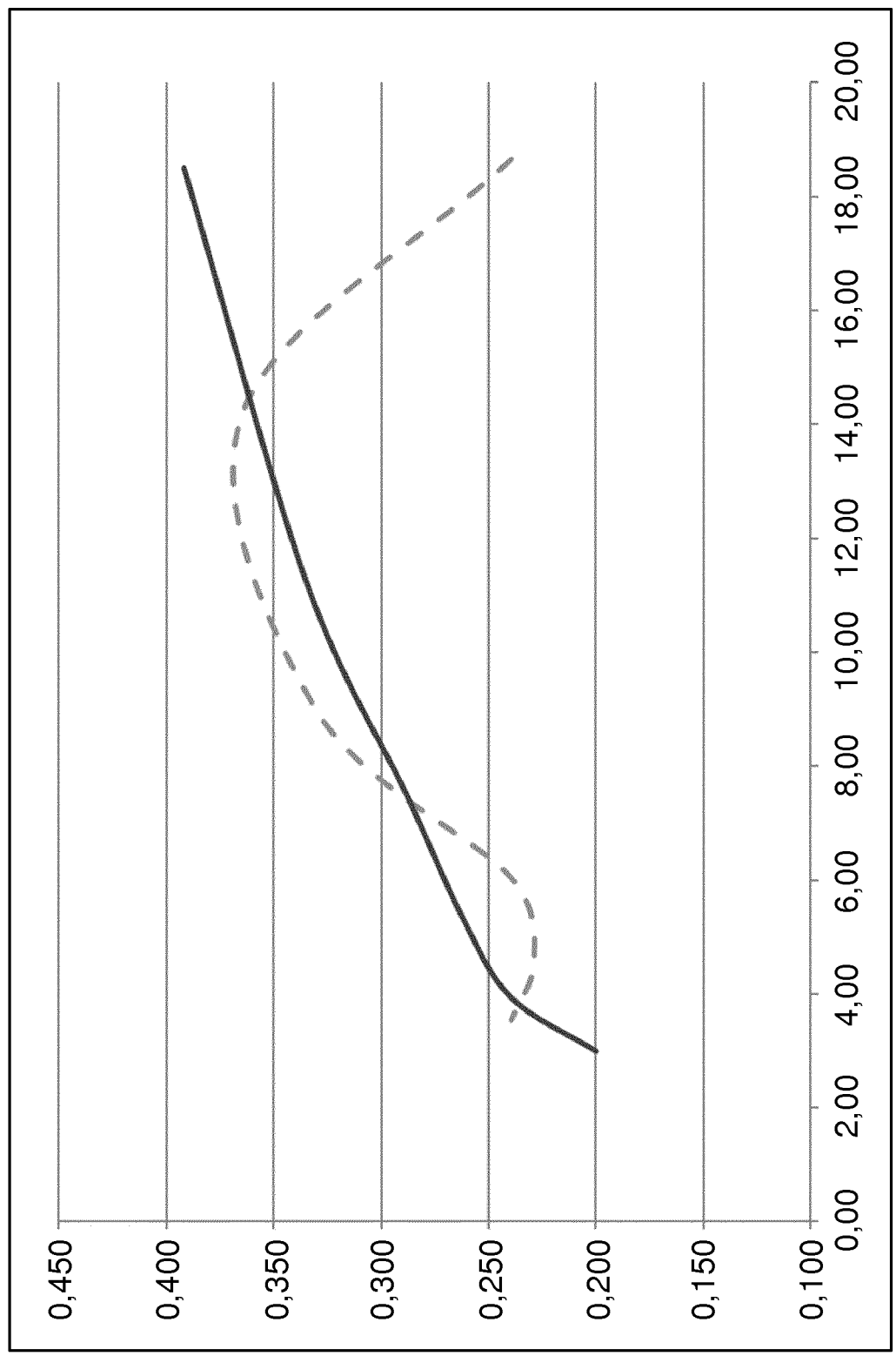
FIG. 12 shows a schematic graph of transmission ratios.

FIG. 12 shows an example of a ratio evolution for the transmission system of FIG. 5a (dashed line) and the transmission system of FIGS. 6a and 9a (solid line). The horizontal axis represents the total transmission ratio of the transmission system. The total transmission ratio denotes the speed reduction factor of the output relative to the input. The vertical axis represents the ratio of decrease of the total transmission ratio as a function of transmission ratio. The ratio of decrease of the total transmission ratio as a function of transmission ratio can be expressed as $T_n=(R_n-R_{n+1})/R_n$, with $R_n$ the total transmission ratio for gear n. For example, the total transmission ratio of the first gear is $R_1=18.56$, of the second gear $R_2=11.25$, of the third gear $R_3=7.51$, of the fourth gear $R_4=5.32$, of the fifth gear $R_5=3.94$, of the sixth gear $R_6=2.99$ and of the seventh gear $R_7=2.39$. Then the ratio of decrease is $T_1=0.394$, $T_2=0.332$, $T_3=0.291$, $T_4=0.259$, $T_0=0.242$, and $T_6=0.200$. Hence, the total transmission ratio $R_n$ deceases monotonically for successive higher gears, and also the ratio of decrease $T_n$ decreases monotonically for successive higher gears. Thus, the transmission system provides a highly favourable succession of transmission ratios.

Figure 13:
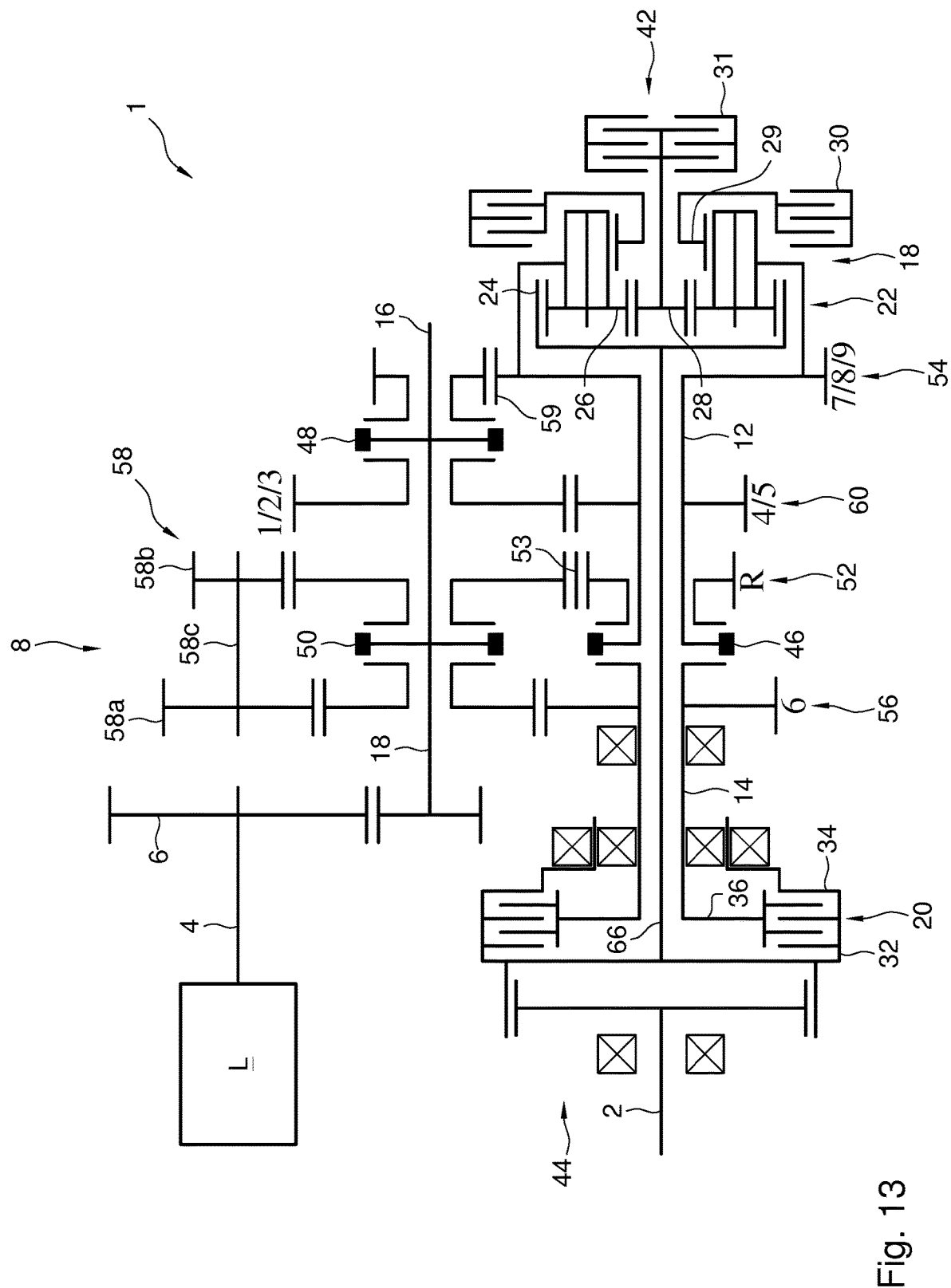
FIG. 13 shows a schematic diagram of an embodiment of a transmission system

FIG. 13 shows a schematic representation of a transmission system 1 for a vehicle. The transmission system 1 shown in FIG. 13 differs from the transmission system shown in FIG. 5a in that the first coupling member 18 includes a planetary gear set 22 comprising four rotational members 24, 26, 28, 29, as in FIG. 4. In this example, the transmission gear 52 is arranged for forming the reverse gear. The transmission gear 54 is arranged for forming the seventh, eight or ninth gear when the first friction member 30, third friction member 31 and second friction member is closed, respectively. The transmission gear 60 is arranged for forming the fourth and fifth gear. The sixth gear is form using gear wheels from the transmission gear 56 and the reverse transmission gear 52. The first, second and third gears are formed using gears of the transmission gears 56 and 58 and the reverse transmission gear 52. However, it will be appreciated that it is also possible to form more than nine gears, or form the gears using different combinations of the transmission gears 52, 54, 56, 58 and 60. It will be appreciated that the modification as shown in FIG. 13, can also be applied to the transmission system of FIG. 6a or 9a.

Figure 14:
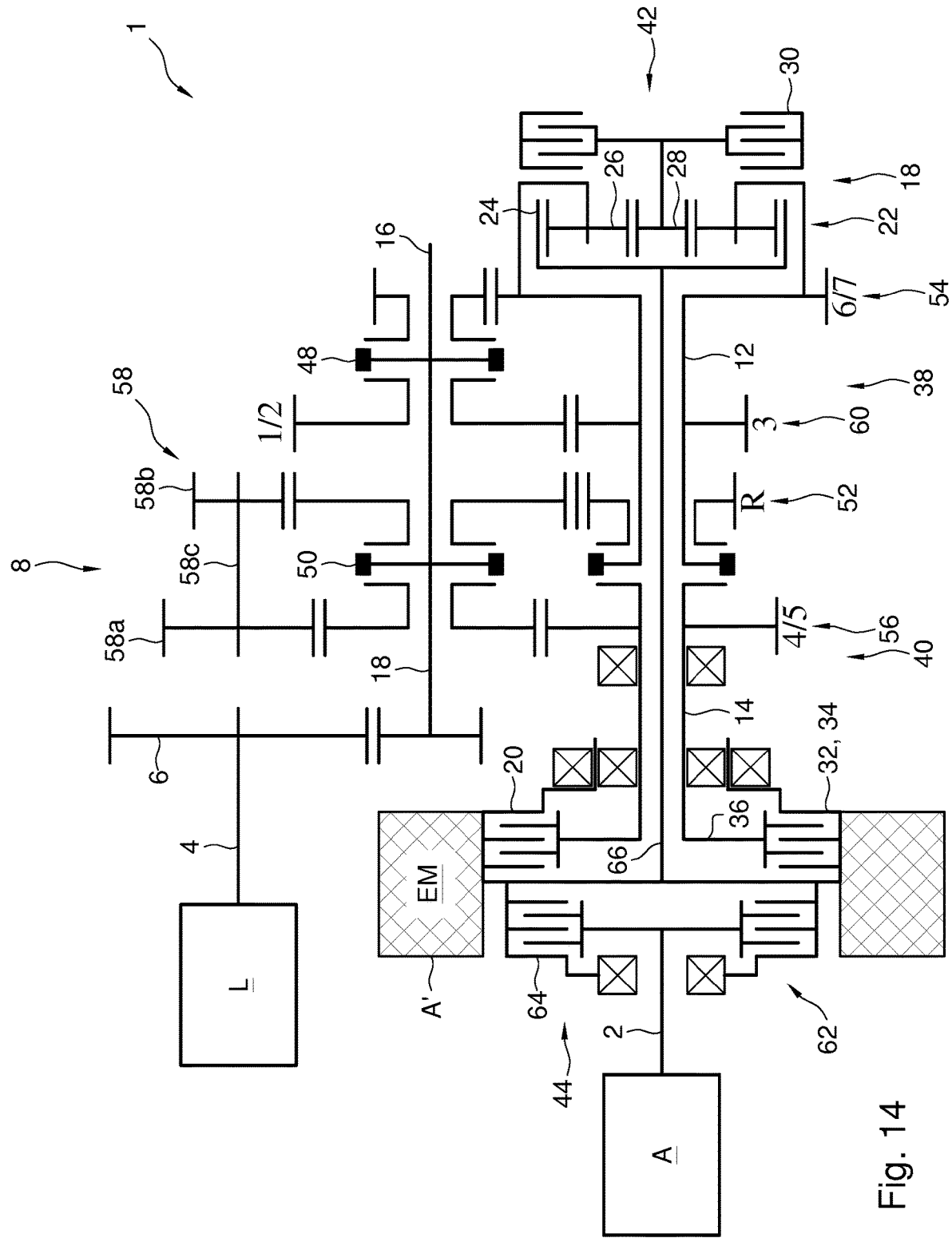
FIG. 14 shows a schematic diagram of a control strategy for a transmission system.

FIG. 14 shows a schematic representation of a transmission system 1 for a vehicle. In FIG. 14 the transmission system 1 includes an initial coupling member 62. The initial coupling member 62 includes a friction element. Here the initial coupling member 62 is a friction clutch. The initial coupling member 62 is included in the input 2 of the transmission system. Here the initial coupling member 62 connects the input 2 to the second coupling member 20. The initial coupling member 62 enables selectively coupling of the transmission to the drive source A or to an additional machine A'. The additional machine A' can be an electric machine, such as an electric motor or an electric generator. In this example, the additional machine is an electric motor EM.

Here the additional machine A' is connected to an output 64 of the initial coupling member and a common input 66 of the first and second coupling members 18, 20. When the initial coupling member 62 is closed the drive source A is connected to the common input 66 and the transmission system can be operated as described in view of FIG. 5a with the drive source A driving the transmission. When the initial coupling member is open the drive source A is disconnected from the common input 66 and the transmission van be driven by the electric motor EM. It will be appreciated that when the initial coupling member 62 is closed the electric motor EM may additionally drive the transmission.

In this example the initial coupling member 62 is located axially within the additional machine A'. Hence, here the electric motor EM is concentric with the initial coupling 62. In this example, the second coupling member 20 is also located axially within the additional machine A'. It will be appreciated that the modification as shown in FIG. 14, can also be applied to the transmission system of FIG. 6a or 9a.

Figure 15:
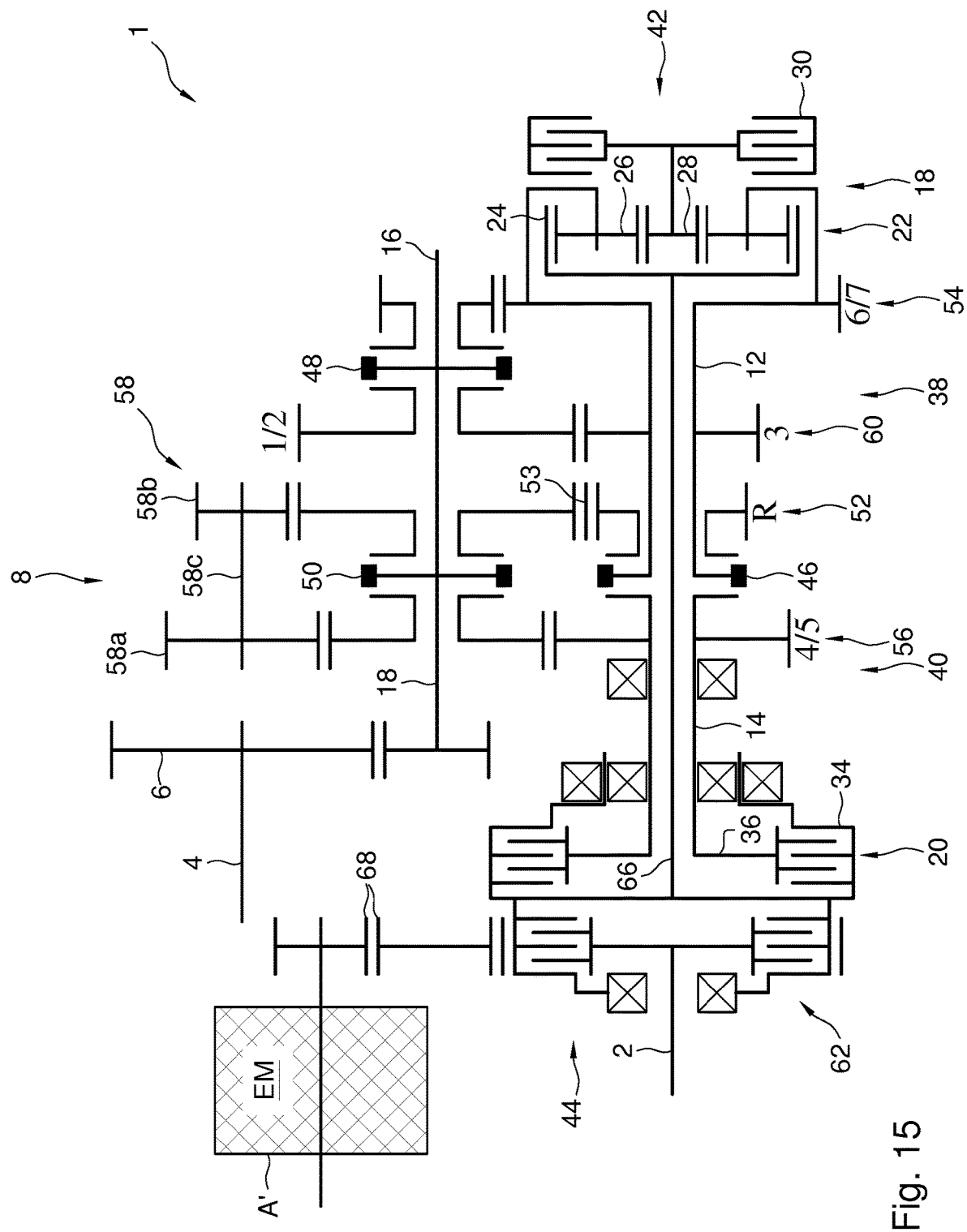
FIG. 15 shows a schematic diagram of a control strategy for a transmission system.

FIG. 15 shows a schematic representation of a transmission system 1 for a vehicle. In FIG. 15 the additional machine A' is positioned radially offset relative to the initial coupling member 62. In this example the additional machine is connected to the initial coupling member 62 via gears 68. It will be appreciated that the modification as shown in FIG. 15, can also be applied to the transmission system of FIG. 6a or 9a. In the examples of FIGS. 14 and 15 the initial coupling member 62 is normally open, so that the drive source A is disengaged when the initial coupling member 62 is not actuated.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged.

The transmission system may be implemented in a vehicle, such as cars, recreational vehicles, trucks, buses, bicycles, motorcycles, lawn mowers, agricultural vehicles, construction vehicles, golf carts, trolleys and robotic vehicles. Other vehicles are possible as well. The shown embodiments involved vehicles comprising four wheels, however vehicles with a different number of wheels can be utilized. It also perceivable that a plurality of transmission systems are included in a vehicle.

Actuation of the coupling members may be performed by means of a hydraulic actuation system. However other embodiments may include actuation by means of mechanical, electromechanical or electro-hydraulic systems. A combination of actuation systems for the different components of the transmission are also envisaged.

The motor or engine of the vehicle comprising the transmission system according the current invention may be or include any combination of an internal combustion engine and an electric motor. Other motors and engines are possible as well such as a fuel-cell motor. In some embodiments, the motor is a hybrid engine and/or could include multiple types of engines and/or motors. For instance, a gas-electric hybrid car could include a gasoline engine and an electric motor. Other examples are possible.

It will be appreciated that the method may include computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A transmission system for a vehicle having an input arranged for connection to a drive source, and an output arranged for connection to a load, and comprising:
   a transmission comprising
      a first input shaft, a first output shaft connected to the output, and a first speed transforming gear connecting the first input shaft and the first output shaft, and
      a second input shaft, a second output shaft connected to the output, and a second speed transforming gear connecting the second input shaft and the second output shaft,
   a first coupling member including a first friction element, the first coupling member having a first section which is directly connected to the input, and a second section which is directly connected to the first input shaft of the transmission,
   a second coupling member including a second friction element, the second coupling member having a third section which is connected to the input, and a fourth section which is connected to the second input shaft of the transmission, and
   a further coupling member located between the first and second input shaft,
   wherein the first and/or second speed transforming gears are axially positioned between the first friction element and the second friction element, said first speed transforming gear being coupled from the input to the output through said first coupling member and said second speed transforming gear being coupled from the input to the output through said second coupling member,
   wherein the first coupling member includes a planetary gear set comprising at least three rotational members, the first friction element is a friction brake, and the second coupling member is a clutch,
   wherein the second coupling member is positioned at a front end of the transmission at the side of the drive source, and the first coupling member is positioned at the opposite side of the transmission, and
   wherein the further coupling member is arranged to directly couple the first input shaft and the second input shaft.

2. The transmission system according to claim 1, wherein the first and/or second coupling member includes a planetary gear set comprising at least four rotational members and two friction brakes.

3. The transmission system according to claim 1, wherein a rotational member of the planetary gear set is directly connected to a gear wheel of the first or second speed transforming gears.

4. The transmission system according to claim 1, wherein at least one rotational member of the planetary gear set is at least partially positioned inside a gear wheel of the first or second speed transforming gears.

5. The transmission system according to claim 1, wherein the first and second speed transforming gear each include an input gear wheel and an output gear wheel which are radially offset.

6. The transmission system according to claim 5, wherein the first and second speed transforming gears each include one or more transmission gears, each transmission gear, except a reverse gear, consisting of an input gear wheel and an output gear wheel which are radially offset.

7. The transmission system according to claim 1, wherein the first speed transforming gear includes a reverse transmission gear.

8. The transmission system according to claim 7, wherein the first or second speed transforming gear includes a transmission gear coupled to the reverse transmission gear.

9. A vehicle including the transmission system according to claim 1.

10. The transmission system of claim 1, wherein the input is configured for direct connection to the drive source.

* * * * *